United States Patent
Tsuda

(10) Patent No.: US 7,225,181 B2
(45) Date of Patent: May 29, 2007

(54) DOCUMENT SEARCHING APPARATUS, METHOD THEREOF, AND RECORD MEDIUM THEREOF

(75) Inventor: Hiroshi Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 842 days.

(21) Appl. No.: 09/768,062

(22) Filed: Jan. 24, 2001

(65) Prior Publication Data

US 2001/0020238 A1 Sep. 6, 2001

(30) Foreign Application Priority Data

Feb. 4, 2000 (JP) ............................. 2000-028299

(51) Int. Cl.
*G06F 17/30* (2006.01)
(52) U.S. Cl. ................. 707/3; 707/1; 707/10
(58) Field of Classification Search ............ 707/3, 707/4, 5, 10
See application file for complete search history.

(56) References Cited

U.S. PATENT DOCUMENTS

| | | | | |
|---|---|---|---|---|
| 5,992,737 A | * | 11/1999 | Kubota | 707/100 |
| 6,026,398 A | * | 2/2000 | Brown et al. | 707/5 |
| 6,119,078 A | * | 9/2000 | Kobayakawa et al. | 704/3 |
| 6,144,973 A | * | 11/2000 | Fujii et al. | 715/501.1 |
| 6,285,999 B1 | * | 9/2001 | Page | 707/5 |
| 6,366,908 B1 | * | 4/2002 | Chong et al. | 707/3 |
| 6,446,095 B1 | * | 9/2002 | Mukai | 715/501.1 |
| 6,505,232 B1 | * | 1/2003 | Mighdoll et al. | 707/10 |

FOREIGN PATENT DOCUMENTS

| | | |
|---|---|---|
| JP | A-03-241456 | 10/1991 |
| JP | A-10-154033 | 6/1998 |
| JP | A-10-154144 | 6/1998 |

OTHER PUBLICATIONS

Koganezwa, K (Redunancy resolution for robot manipulators-com of computional efficiency between the SVDs, the similarity factorization and recursive formulation), Computational Intelligence in Robotics and Auto 2001, p. 89-95.*
Taher et al. (Evaluating Strategies for Similarity Search on the web), ACM Surveys, pp. 469-503, year 2002.*
Brin, et al., "The Anatomy of a Large-Scale Hypertextual Web Search Engine", Computer Science Department, Stanford University (http://www.elsevier.nl/cas/t/ree/store/comnet/free/www7/1/921/com1921.htm).
http://www.csl.sony.co.jp/~masui/POBoxInline/manual_usage.html.
English Translation of http://www.csl.sony.co.jp/~masui/POBoxInline/manual_usage.html.

* cited by examiner

*Primary Examiner*—Jean M. Corrielus
*Assistant Examiner*—Baoquoc N. To
(74) *Attorney, Agent, or Firm*—Staas & Halsey LLP

(57) ABSTRACT

A document searching apparatus for searching a document group having a link relation for particular document is disclosed, that comprises a link importance assigning unit weighting the link relation and assigning the link importance which indicates importance of the document based on the weighted link relation to each document, and an accessing unit accessing the particular document based on the link importance. Thus, important document can be automatically searched.

28 Claims, 32 Drawing Sheets

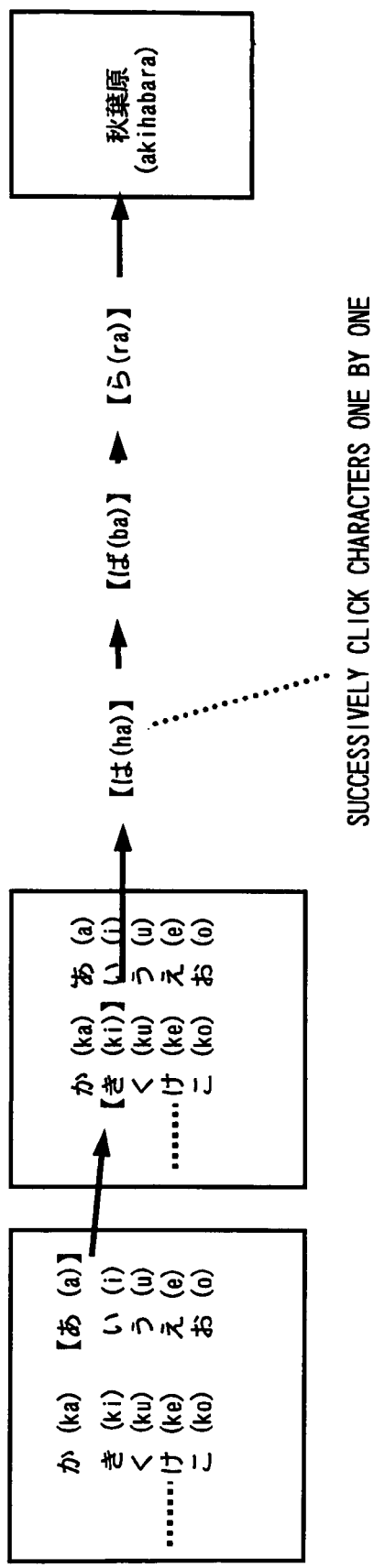
F I G. 1

KEYWORD TABLE 51

| KWD ID | REPRESENTATIVE WORD | OCCURRENCE DOCUMENT |
|---|---|---|
| 001 | コンピュータ (konpyu-ta: COMPUTER) | |
| .... | | |

KEYWORD RELATION TABLE 52

| KEYWORD | PRONUNCIATION CHARACTERS | KWD ID |
|---|---|---|
| computer | COMPUTER | 001 |
| コンピュータ | こんぴゆた | 001 |
| プログラム | ぷろぐらむ | 002 |
| ⋮ | | |

OCCURRENCE DOCUMENT TABLE 53

| DOCUMENT ID | OCCURRENCE |
|---|---|
| 00001 | 8 |
| 00003 | 1 |
| ⋮ | |

FIG. 4

| CHARACTER STRING | FOLLOWING CHARACTER STRINGS | KEYWORD STRINGS |
|---|---|---|
| TOP | あ (a), い (i), .. | |
| あ (a) | あいぼ(aibo), あお(ao), ... | |
| あいぼ (aibo) | | 相棒 (aibou:MATE), アイボリー(aiborī : IVORY). |
| あお (ao) | あおぞ(aozora) | 青 (ao: BLUE), 蒼 (ao: DARK BLUE), ... |

INDEX INFORMATION TABLE 61

| KEYWORD ID | CORRELATED DOCUMENT ID STRINGS |
|---|---|
| 093 | 0005, 0008, .. |
| 321 | 0004, 0008, ... |
| .... | |

CORRELATED DOCUMENT TABLE 62

| DOCUMENT ID | CORRELATED KEYWORD ID STRINGS |
|---|---|
| 0005 | 093, 099, 122, ... |
| 0008 | 093, 156, 321, ... |
| . | |

CORRELATED KEYWORD TABLE 63

FIG. 5

FORMAT IN yyyymmddHHMM

| DATE AND TIME | KWD ID | DOCUMENT ID |
|---|---|---|
| 200001121436<br>200001121437<br>·<br>·<br>· | 003<br>005 | 00123<br>00054 |

ACCESS LOG 71

FIG. 6

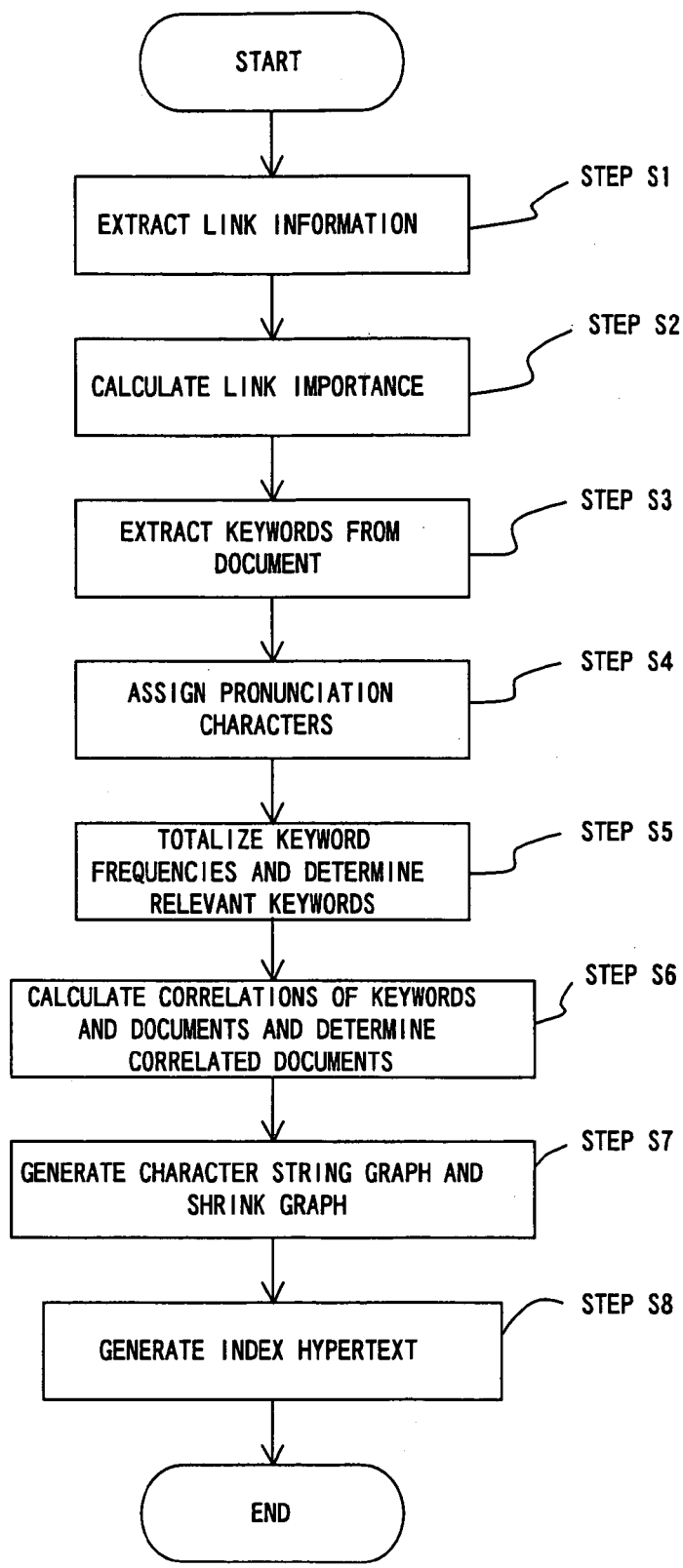
F I G. 7

CIRCLE(○) : WEB PAGE
THICKNESS OF ARROW(→) : LINK WEIGHT
PATTERN OF CIRCLE(○) : URL SIMILARITY $$\boxed{\text{sim}(p_i,\ q)=1}$$

$$lw(p_i,\ q) = \frac{1}{\text{sim}(p_i,\ q)} = 1$$

$$w_q = c_q + w_{p1} + w_{p2} + w_{p3}$$

$$\boxed{\text{sim}(p_i,\ q)=n+1}$$

$$lw(p_i,\ q) = \frac{1}{\text{sim}(p_i,\ q)} = \frac{1}{n+1}$$

$$w_q = c_q + \frac{w_{p1} + w_{p2} + w_{p3}}{n+1}$$

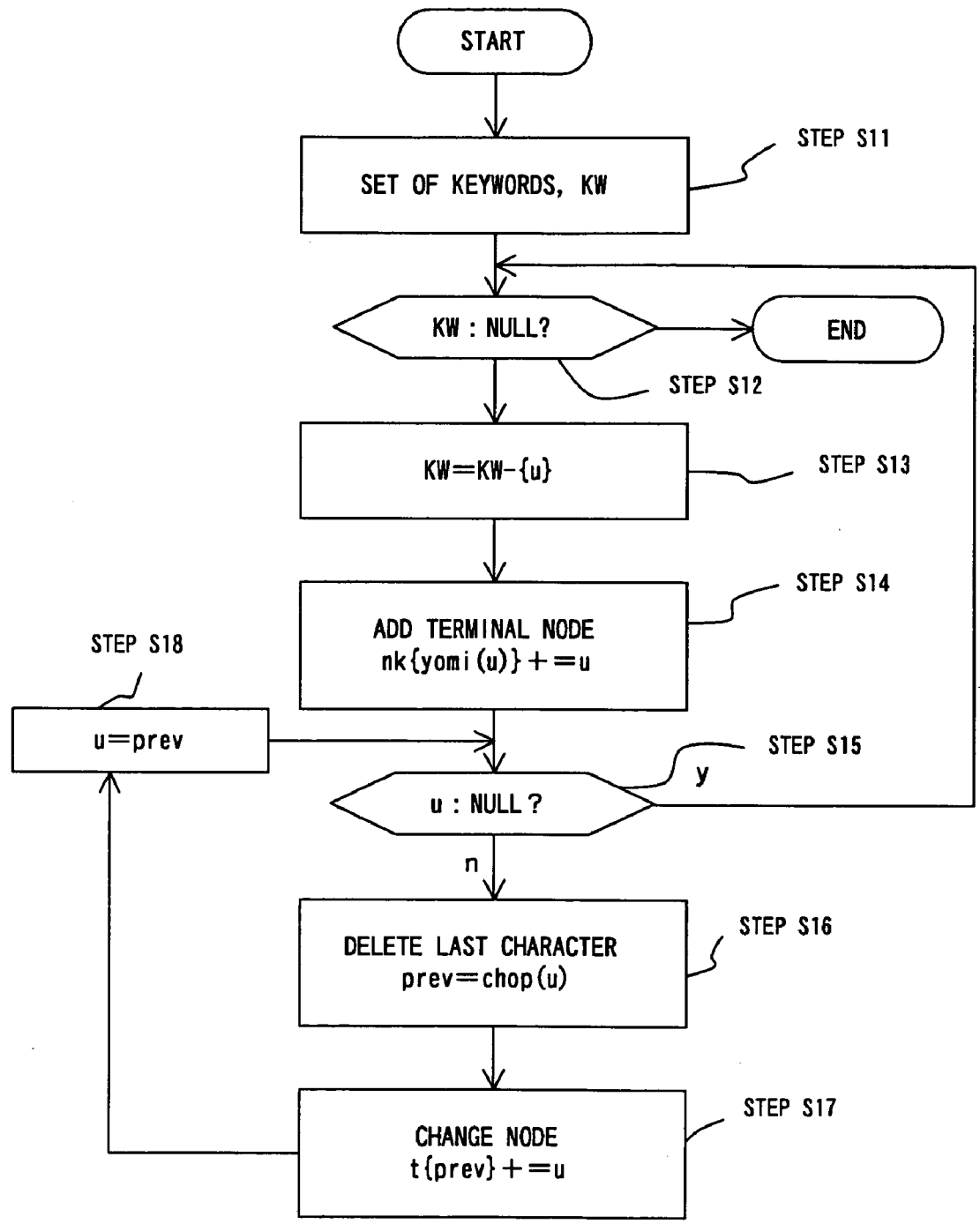
F I G. 1 2

```
proc init_kw_graph ()
{
    @KW:set of keywords;        #  SET OF KEYWORDS
    yomi : YOMI/Spell of keywords;    #  FUNCTION OR ARRAY THAT RETURNS PRONUNCIATION CHARACTERS OF KEYWORD
    foreach u in KW {            #  FOR EACH KEYWORD u
        nk{yomi(u)} .= u."+";    # DESIGNATE nk() OF NODE OF PRONUNCIATION CHARACTERS OF KEYWORD u
        for ( i=0; i<length(u); i++) {    # REPEAT FOR LENGTH OF CHARACTER STRING OF KEYWORD u
            local prev = chop(u);        # DELETE LAST CHARACTER OF KEYWORD u AND ADD TO PARENT NODE
            t{prev} .= u."+";
            u = prev;
        }
    }
}
```

F I G. 1 3

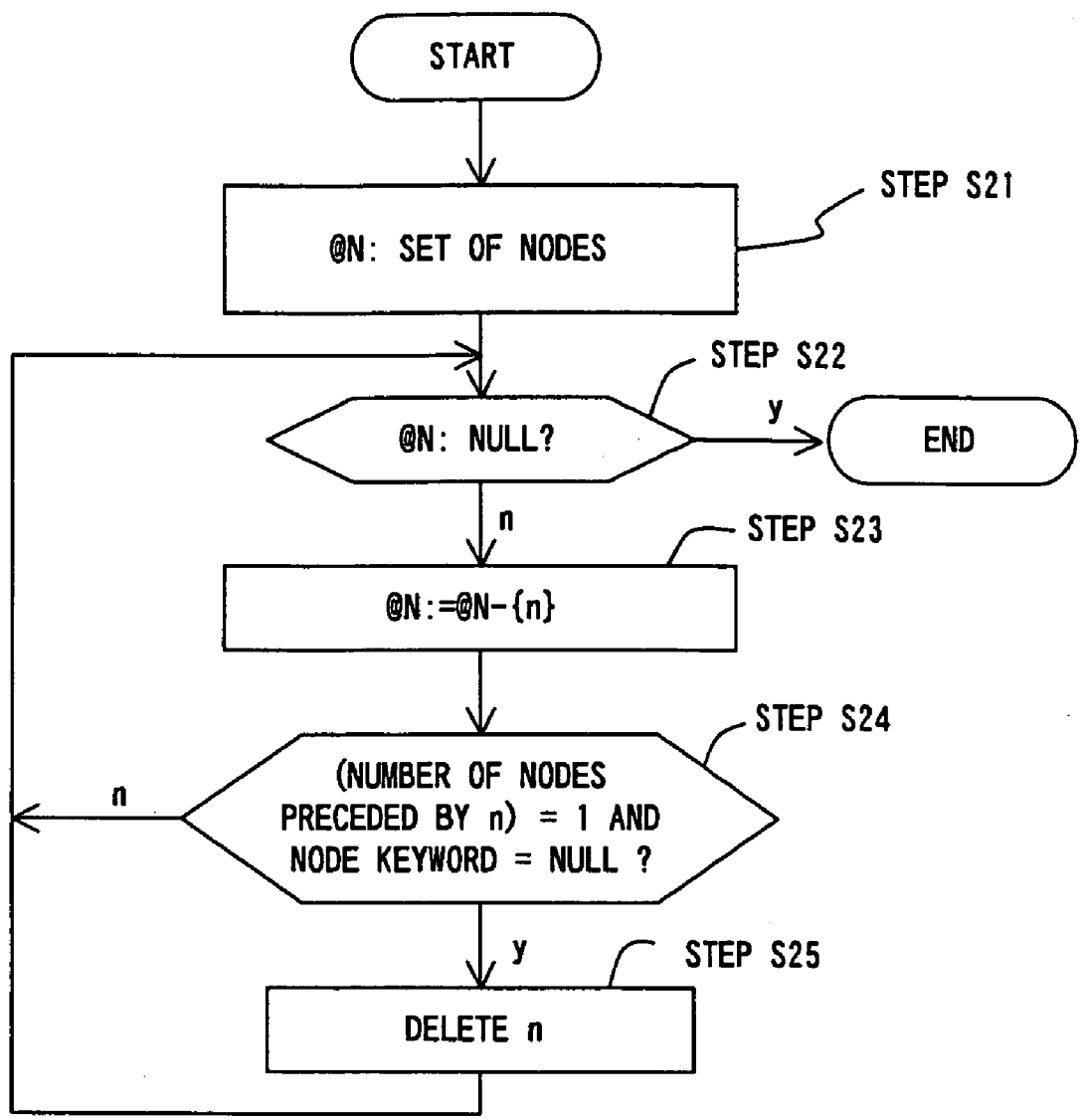
F I G. 1 4

```
proc shrink_middle ()
{
  @N : set of nodes
  foreach n (@N) {
    next = t{n};      # NEXT NODE LIST
    kw = nk{n};       #  KEYWORD LIST
    if (length(next) ==1 && kw == "") {
      delete(n)              #  DELETE NODE n
    }
  }
}
```

F I G. 1 5

```
proc shrink_leaf ()
{
    @N: set of nodes;         # NODE LIST
    word_max = 2;             # word_max : IN THIS EXAMPLE, 2
    changed = true;           # WHEN KEYWORD IS TRANSFERRED, true
    @N = sort by_nk_length @N;  # SORTING IN ASCENDING ORDER OF NUMBER OF KEYWORDS
    while (changed) {         # CONTINUING WHILE TRANSFER IS PERFORMED
        changed = false;
        foreach n in @N {
            if (is_leaf(n)) {     # IN THE CASE OF TERMINAL NODE
                p = parent_node(n);    # PARENT NODE
                if (length(nk{p}) + length(nk{n}) < word_max ) {
                    nk{p}.= nk{n}."+";   # TRANSFERRING KEYWORD
                    delete (n);          # DELETE TERMINAL NODE
                    changed = true;      # PROOF OF TRANSFER
                }
            }
        }
    }
}
```

F I G. 1 7

INTELLECTUAL 50-KANA CHARACTER INDEX OF INTRA-COMPANY PAGES

| あ(a) | い(i) | う(u) | え(e) | お(o) | | | | | |
|---|---|---|---|---|---|---|---|---|---|
| か(ka) | き(ki) | く(ku) | け(ke) | こ(ko) | が(ga) | ぎ(gi) | ぐ(gu) | げ(ge) | ご(go) |
| さ(sa) | し(shi) | す(su) | せ(se) | そ(so) | ざ(za) | じ(ji) | ず(zu) | ぜ(ze) | ぞ(zo) |
| た(ta) | ち(chi) | つ(tsu) | て(te) | と(to) | だ(da) | ぢ(di) | づ(du) | で(de) | ど(do) |
| な(na) | に(ni) | ぬ(nu) | ね(ne) | の(no) | | | | | |
| は(ha) | ひ(hi) | ふ(fu) | へ(he) | ほ(ho) | ば(ba) | び(bi) | ぶ(bu) | べ(be) | ぼ(bo) | ぱ(pa) |
| ま(ma) | み(mi) | む(mu) | め(me) | も(mo) | | | | | |
| や(ya) | | ゆ(yu) | | よ(yo) | | | | | |
| ら(ra) | り(ri) | る(ru) | れ(re) | ろ(ro) | | | | | |
| わ(wa) | | | | | | | | | |

A B C D E F G H I J K L M N O P Q R S T U V W X
1 2 3 8 s (NOTE) "-" LONG SOUND SHOULD BE REMOVED. SELECT "っ(tu)" AND "や(ya)" FOR "っ(tu)" AND "や(ya)".

SEARCH FOR A KEYWORD INCLUDING                    CLEAR

| い(i) | え(e)そ(ro) | | | | |
|---|---|---|---|---|---|
| か(ka) | き(ki) | く(ku) | け(ke) | こ(ko)う(u) | が(ga) ぎ(gi) ご(go) |
| さ(sa) | し(shi) | す(su) | せ(se) | で(de)ん(un) ど(do) | |
| た(ta) | ち(chi) | つ(tsu) | | | |
| に(ni) | の(no) | | | | |
| ば(ba) | ぺ(be)ん(un) と(to) | | | | |
| み(mi) | め(me)じ(ji) | | | | |
| や(ya) | ゆ(yu) | よ(yo) | | | |
| ら(ra) | り(ri) | る(ru) れ(re) | | | |
| わ(wa) | ん(un) | | | | |

(NOTE) "－" LONG SOUND SHOULD BE REMOVED. SELECT "っ(tu)" FOR "つ(tu)" AND "や(ya)" AND "や(ya)".

OTHER KEYWORDS

- イオン (ion)
- イネーブル (inēburu)
- 伊豆 (izu)
- 位相 (isou)
- 依存 (izonn)
- 依存性 (izonnsei)
- 意図 (ito)
- 意欲 (iyoku)
- 移転 (itenn)
- 違反 (ihann)
- 違反行為 (ihannkoui)
- 遺族 (izoku)
- 医薬 (iyaku)
- 医用 (iyou)
- 稲城長沼 (inaginaganuma)
- 急ぎ (isogi)
- 居酒屋 (izakaya)
- 指宿 (ibusuki)
- 色刺激 (iroshigeki)
- 田舎 (inaka)

F I G. 2 3

"いべんと" (ibento)

KEYWORDS
- ibento
- ibento ID
- ibento karendā
- ibento sābisu
- ibento sukejyūru
- ibento maikurosofuto

- ibento rogu
- ibento annnai
- ibento kudou
- ibento tetsuzuki
- ibento tsuchi
- ibento naiyou

- ibento hassei
- ibento horyu
- kaisaiyotei ibento
- kannshi ibento
- yotei ibento

トップ (toppu) - イ(i) - イベント (ibento)

(IBENTO KARENDĀ : EVENT CALENDAR)

MAJOR PAGES ABOUT "イベントカレンダー"

- http://www.paso.co.jp/event/2000.html (03/17/1999)
  2000 NEN KARENDĀ : CALENDAR OF YEAR 2000
  (KEYWORDS: ソフトウェア(sofutouea:SOFTWARE),展示会(tenjikai:EXHIBITION))
- http://www.cal.co.jp/event9907.html (06/23/1999)
  7 GATSU NO MOYOUSHI : EVENT ON JULY
  (KEYWORDS:音楽会(ongakukai : CONCERT), コンサート(konsāto : CONCERT))
- http://www.yahoo.co.jp/event/ (06/23/1999)
  イベントリスト (ibento risuto : EVENT LIST)

FIG. 26

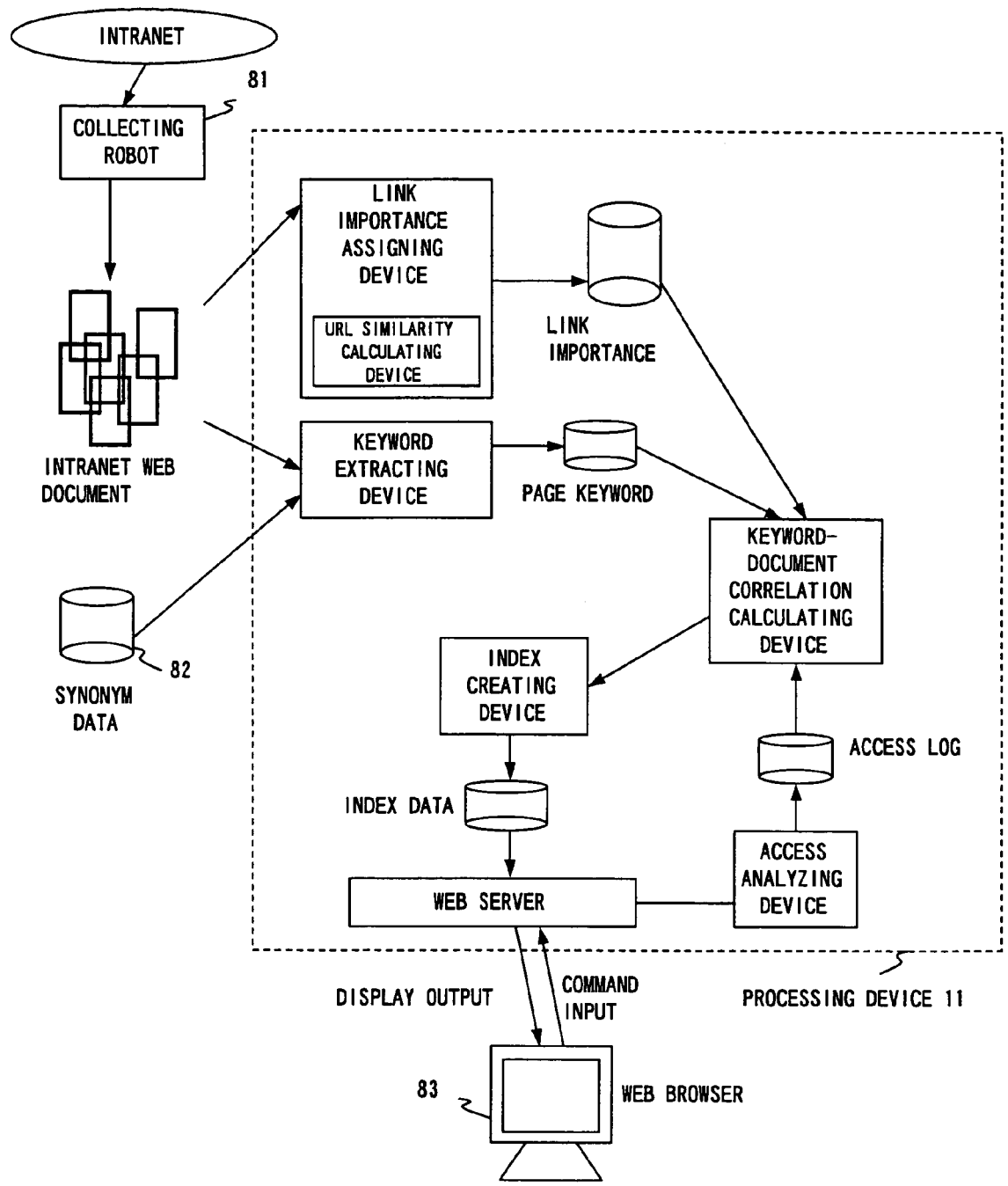
F I G. 2 7

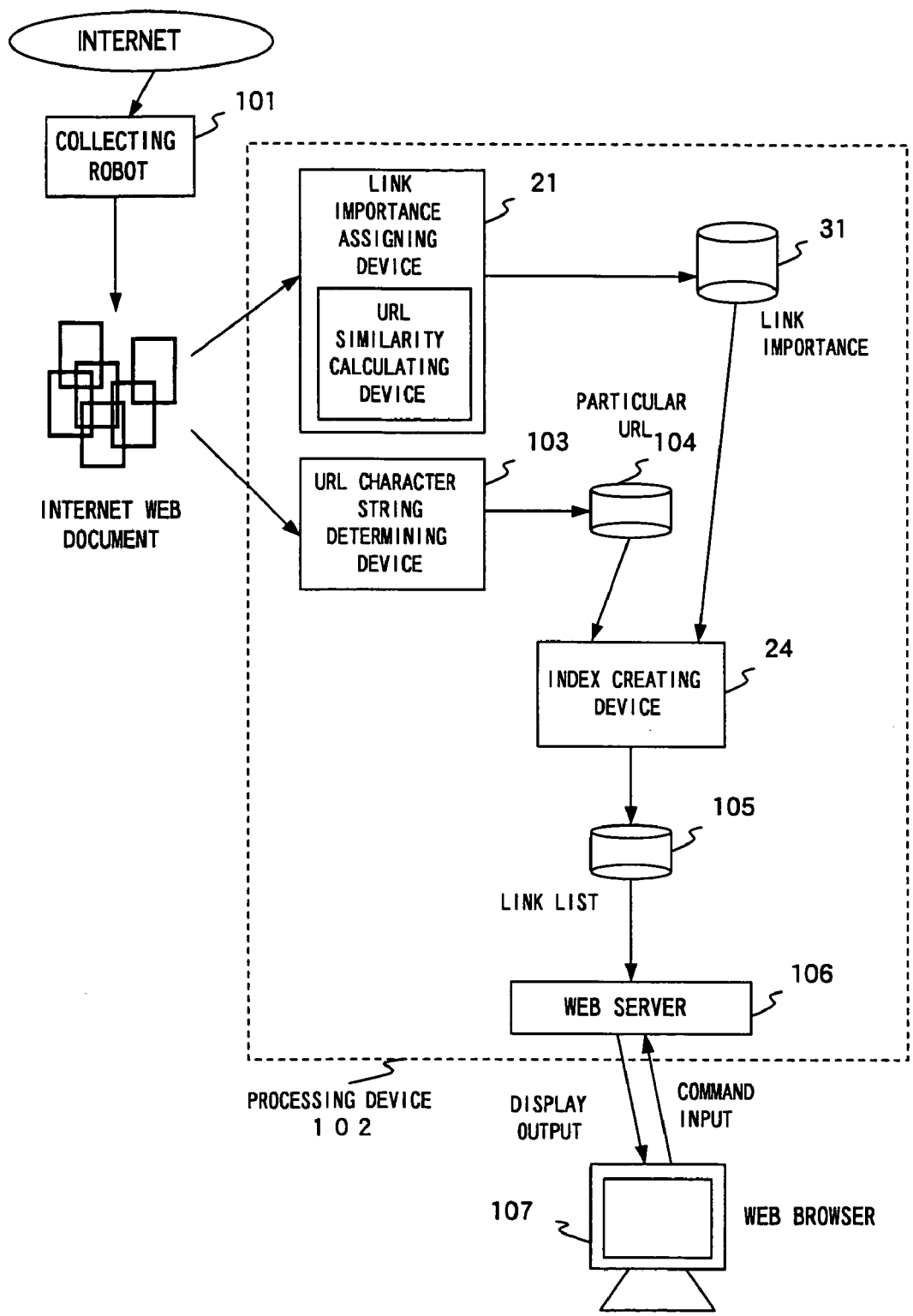
F I G. 29

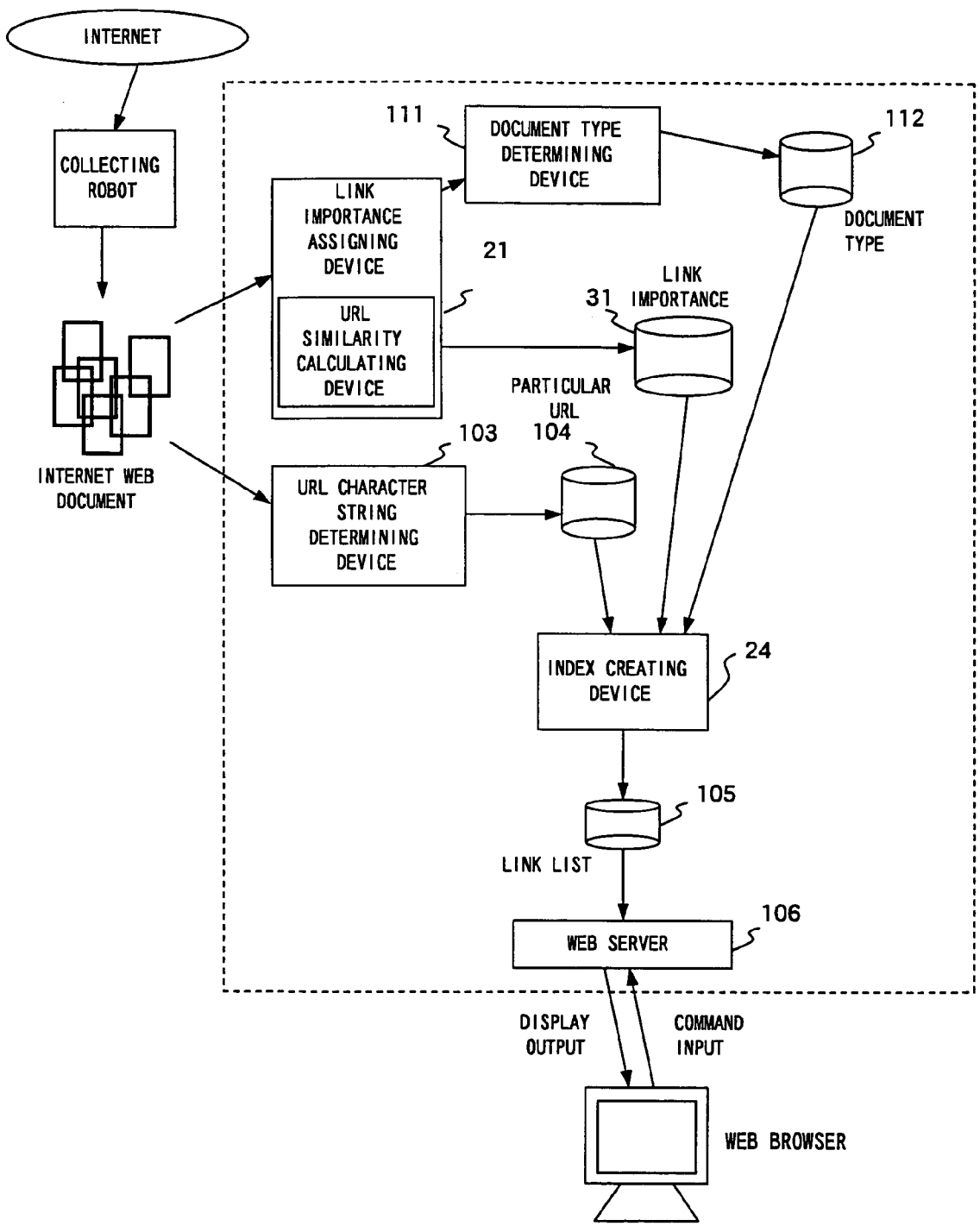
F I G. 3 0

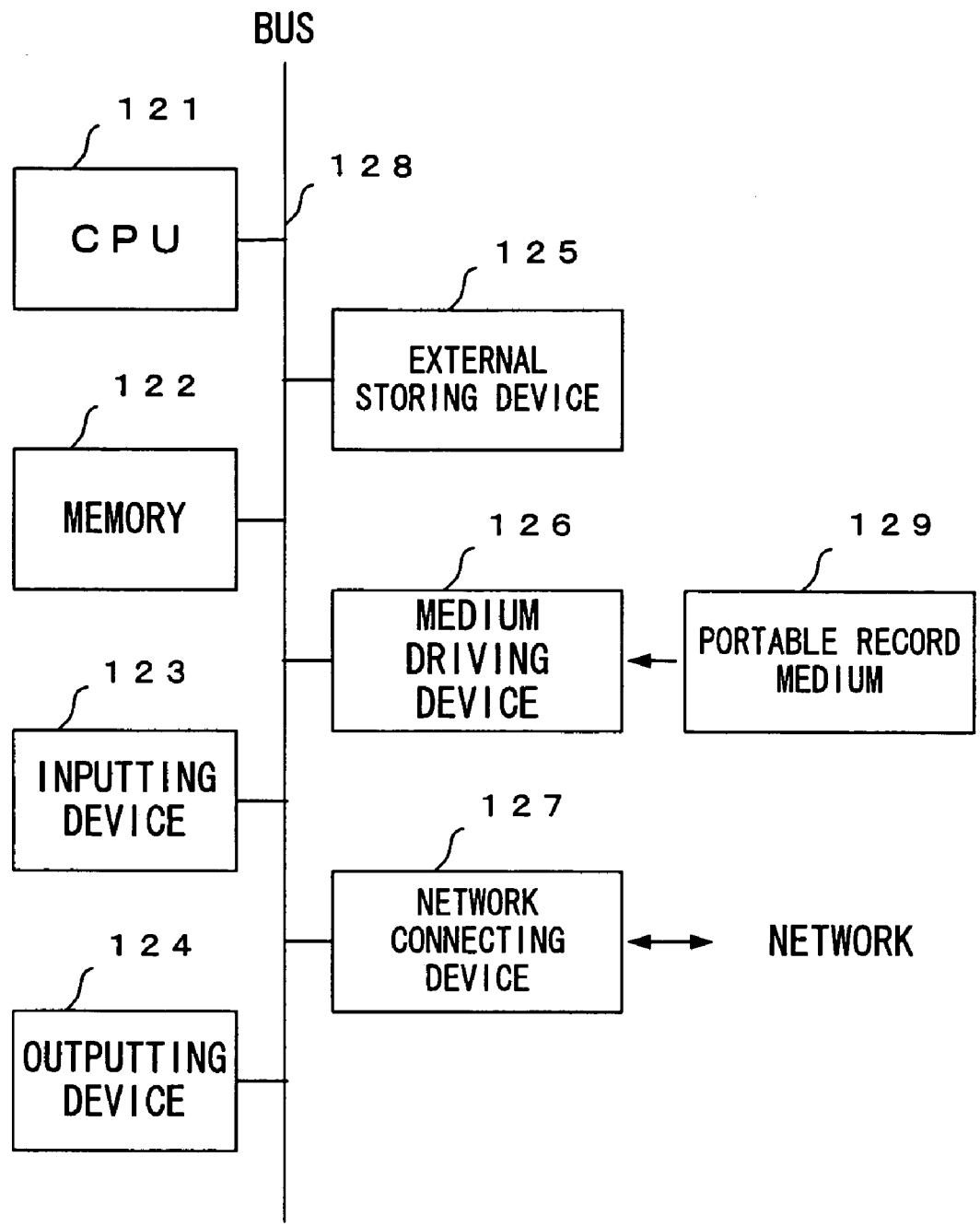
F I G. 3 1

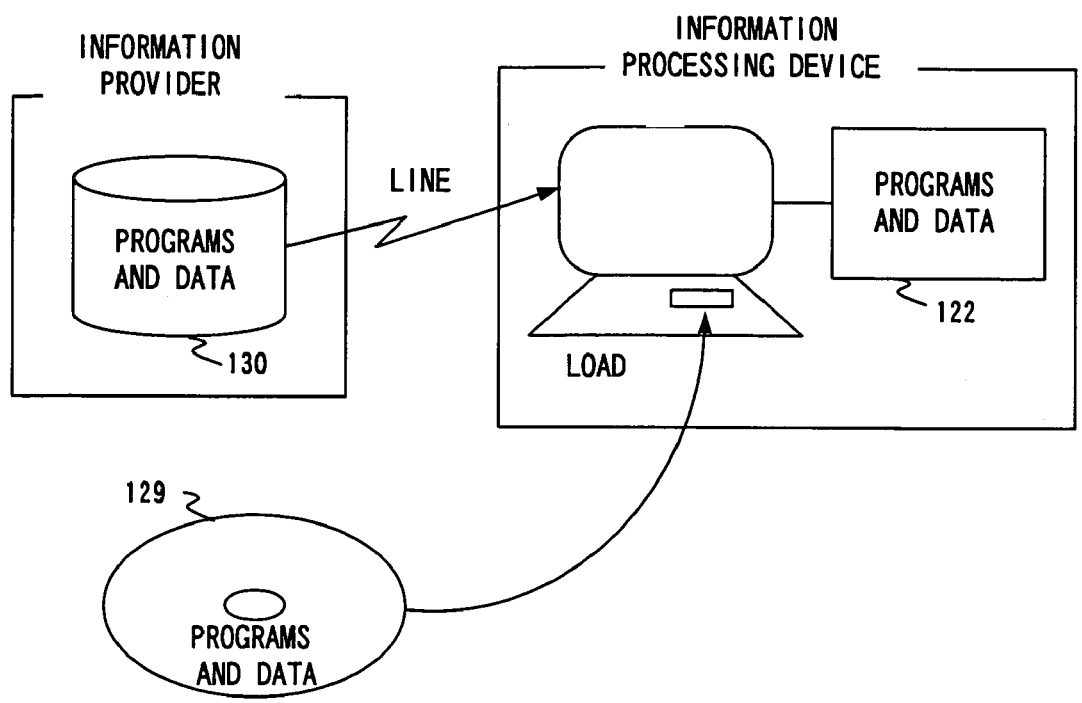
F I G. 3 2

DOCUMENT SEARCHING APPARATUS, METHOD THEREOF, AND RECORD MEDIUM THEREOF

BACKGROUND OF THE INVENTION

1. Field of the Invention

The present invention relates to a document searching apparatus for searching a group of a huge number of document files stored in an information processing device for a desired file based on the content of the document, the link relation of the document, the storage location of the document and so on, and also relates to a method thereof and a record medium thereof.

2. Description of the Related Art

As the computer networks have progressed, a huge amount of online document information (web page) has emerged. To search and organize such a huge amount of online document information, an indexing service for the information is known.

For example, as an Internet web page searching service, a directory service is known. In the directory service, links of web pages are hierarchically categorized and listed. The service has the following advantages:

Only by selecting (clicking) a category, links of web pages that the user wants to browse can be obtained.

Since web pages are categorized, unnecessary information is not searched.

Since web pages are manually categorized, irrelevant information can be suppressed from being mixed with relevant information.

With such advantages, the service has been very widely used on the Internet. However, such a service requires a manual work for categorizing and managing web pages. Thus, the operation cost becomes high.

To automatically maintain the entire directory service, the following problems should be solved.

Important documents should be selected.

Category hierarchy should be managed (for example, topics should be added and deleted time by time).

Documents should be automatically categorized.

Next, the selecting operation of important documents will be described. On the Internet and an intranet, web pages are drastically increasing time by time. Thus, pages of similar information are created by different people everywhere. Thus, even if web pages are searched for desired information using a keyword, a very large number of pages are hit. Thus, the user does not know what information is important in a huge number of web pages as the search results. To solve such a problem, the following methods are available.

Search results are sorted in the order that a search request is satisfied. In other words, search results are sorted and ranked based on the number of keywords or the like contained in web pages.

Search results are visualized for assisting accesses. In other words, documents as search results are grouped (clustered) based on the contents.

Search results are sorted based on attributes (such as size, date/time of creation, and so forth) of each document.

Search results are sorted in priority levels assigned by any means. For example, search results are sorted based on meta data such as a link relation, an analysis of a user's access log, or a rating assigned by a third party.

As a considerable example, a document importance assignment using a link relation of hypertext such as a web page is becoming an important technology on the research and service stages. The simplest representation of a link importance assignment corresponding to the link relation is based on an intuition of "the importance of a document that are linked from many documents is high".

However to allow the user to easily navigate information, there is a tendency of which web pages stored in the same server are linked each other. For example, in personal web pages, there are many links to their top page such as "return to the top of XX". Thus, by counting documents which refer to the document, when the document is in a server or a personal home page that contains a large number of documents, the importance of the document becomes high. In addition, when a malicious person know that a searching system detects the importance of documents based on the number of linked documents, he or she can meaninglessly separate pages or add pages that are meaninglessly linked to other documents so as to raise the importance of his or her web pages.

To deal with such a problem, in addition to the intuition of "the importance of a document that are linked from many documents is high", other intuitions of "the importance of a document that is linked from an important document is high." and "the importance of a page linked from a page that links to fewer pages becomes higher" are suggested in a web page that can be browsed at "http://www.elsevier.nl/cas/tree/store/comnet/free/www7/1921/com1921.htm".

The second intuition is based on a discovery of "the importance of a web page guided by a famous directory service is higher than the importance of a web page guided by a non-famous personal link list". The third intuition is based on a thought of "the importance of a document that is linked from a link list that is linked to 50 documents is higher than the importance of a document that is linked from a link list that is linked to 1000 documents". In an importance determining algorithm based on those intuitions, to calculate an importance of a page A temporary importance is calculated using the number of other pages linking to the page A. The temporary importance is updated using the link relation. Such operations are repeated until converged.

However, in such an algorithm, a site that has a large number of pages is more advantageous than others because it is linked from many pages. Thus, when the importance of pages is calculated, pages in similar sites are sorted as important pages.

When the user searches web pages for desired data, he or she needs to have an interface for accessing a keyword for the desired data. As a related art reference of a keyword accessing interface, a Kana-Kanji converting interface is known.

For example, Japanese Patent Laid Open Publication No. 03-241456 discloses a technology of a Kana-Kanji converting interface using a touch-panel type device. According to the technology, after inputting the pronunciation characters of a keyword using a software keyboard on a screen, the user presses a "convert" key so that the input characters are converted into a regular Japanese character string that contain Kanji characters. Pronunciation characters is used as characters standing for a speech souund of a word.

In addition, Japanese Patent Laid Open Publication Nos. 10-154144 and 10-154033 and a web page that can be browsed at "http://www.csl.sony.co.jp/person/masui/POBox/index.htm" disclose a pen-type text inputting system. According to the technology, although the pronunciation characters of a keyword is input using a software keyboard on a screen, whenever a part of the pronunciation character is input, alternatives of Kanji characters are output based on a user's character input history.

In addition, according to the above-described related art references of Japanese Patent Laid Open Publication Nos. 03-241456, 10-154144, and 10-154033 and the web page, to perform a Kana-Kanji converting operation, since the pronunciation characters (spelling) of a keyword should be input character by character, the user should sometimes input a long character string.

Moreover, an interface for inputting obvious pronunciation characters is known. As an example of such an interface, keyword lists for individual initial characters such as "あ(a)", "い(i)", and so forth are created. On the keyword lists, the user selects a desired one. However, in the example, when there are many keywords of a list starting with a particular pronunciation character, it is difficult for the user to select a particular keyword from the keyword list. An example of such an interface is an automatic transfer machine used in a bank.

In another example of the obvious pronunciation character input interface technology, when successively inputting pronunciation characters (or clicking them with a pointing device) and they match character strings of keywords, keywords as regular character string containing Kanji characters appear. FIG. 1 shows a system of which pronunciation characters that are successively input match character strings of keywords, the input pronunciation characters are converted into a regular character string containing Kanji characters. FIG. 1 shows an example of which a character string "秋 葉 原 (akihabara)" appears. Referring to FIG. 1, the user successively inputs the pronunciation characters using a list of 50-Kana characters. To cause the character string "秋葉原(akihabara)" to appear on the screen, the user successively inputs pronunciation characters "あ (a)", "き (ki)", "は (ha)", "ば (ba)", and "ら (ra)". After all the pronunciation characters "あ き は ば ら (akihabara)" have been input and they matches a keyword, a regular character string containing Kanji characters "秋葉原(akihabara)" appears. However, in such a system, for a long keyword, the user should input many pronunciation characters.

SUMMARY OF THE INVENTION

An object of the present invention is to provide a document searching apparatus and a method thereof that allow the above-described problem of "the importance of a page in a site depends on the number of pages that the site contains" and a particular malicious person to be prevented from controlling the importance of a site.

Another object of the present invention is to provide a document searching apparatus and a method thereof that allow a search keyword to be input with a small number of pronunciation characters and to the number of alternatives of the keyword and documents that appear on a screen to be limited so that the user can easily select a keyword and a document.

A further object of the present invention is to provide an apparatus and a method for creating a link list that can be quickly accessed to an important document (for example, a web page) corresponding to a keyword using a directory service type interface.

A first aspect of the present invention is a document searching apparatus for searching a document group having a link relation for particular document, comprising a link importance assigning unit assigning a link importance calculated by weighting the link relation to the document, and an accessing unit accessing the particular document based on the link importance.

It is considered that document linked from a lot of documents is important. In addition, it is considered that document linked to a small number of documents is more important than document linked to a large number of documents. Corresponding to such rules, the link importance assigning unit weights the link relation, calculates a link importance, and assigns the link importance to the document. The accessing unit accesses document based on the calculated link importance. Thus, important document can be automatically searched. In such a structure, the link importance assigning unit may further comprise a URL similarity calculating unit. The URL similarity calculating unit calculates a URL similarity that is the similarity of URLs (Uniform Resource Locators) that represent a location of the document in a network. The link importance assigning unit calculates a link importance using the URL similarity and the link relation of documents and assigns the link importance to the document.

For example, documents contained in the same site tend to be linked each other. The URLs of documents contained in the same site tend to have a high URL similarity. By lowering the link weight of a link from a document having a higer URL similarity than a link from a document having a lower URL similarity, a site containing a large amount of document can be prevented from being excessively evaluated as an important site. Thus, important documents can be accurately searched. In addition, when the link importance is assigned, since the URL similarity is considered, it becomes difficult for a user to intentionally increase an importance of a particular document by increasing the number of documents linking to the particular document in a site. In addition, the URL similarity may be determined based on characters of a URL containing a server address name, a path, and a file name.

The document searching apparatus may further comprise a keyword extracting unit for extracting a keyword from the document.

The document searching apparatus may further comprise a keyword-document correlation calculating unit. The keyword extracting unit calculates an occurrence frequency of the keyword in the document. The keyword-document correlation calculating unit calculates the correlation of the keyword and the document based on the link importance and the occurrence frequency of the keyword.

The correlation of documents is calculated based on the link importance and the occurrence frequencies of keywords in the documents. When document having a higher correlation is searched, important document that has a higher probability of a correlation with document for which the user wants to search can be searched.

The document searching apparatus may further comprise a monitoring unit monitoring accesses from a user and generating an access log. The keyword-document correlation calculating unit calculates the correlation based on the keyword occurrence frequency, the link importance, and the access log. When the correlation is calculated, since the access log is used, more important document more correlated with the keyword can be searched.

The link importance, the keyword occurrence frequency, and the access log are used to calculate the correlation. Thus, even if the importance of a particular document is maliciously raised, such document can be prevented from being easily searched.

The document searching apparatus may further comprise a document type determining unit determining a document type of a document based on the URL similarity, the number of documents linking to the document, and the number of documents linked from the document. The keyword-document correlation calculating unit selects the document based on the document type and calculates the correlation of the selected document.

Document is categorized as several types such as a link list page and a contents page. Those document types can be determined based on the number of documents linking to the document and the number of documents linked from the document. Based on the document type, document of a particular type (for example, contents page) is selected. The correlation of the selected documents is calculated. Thus, document can be accurately searched.

The document searching apparatus may further comprises an index creating unit creating an index for accessing the keyword based on pronunciation characters or spelling of the extracted keyword.

The document searching apparatus may further comprise a selecting unit allowing the user to select a portion of the pronunciation characters or spelling of the keyword. The index creating unit places less than a predetermined number of highly correlated documents selected from the document in the index based on the correlation calculated by the keyword-document correlation calculating unit. The accessing unit accesses the particular document corresponding to the portion of the pronunciation characters or spelling of the selected keyword. Since the number of documents contained in the index is limited to a predetermined value, the user can easily select a desired document from the index. In addition, the index can be used for a mobile terminal unit such as a cellular phone having a limited space display screen.

The document searching apparatus may further comprises a collecting unit for collecting the particular document from a network.

According to another aspect of the present invention, a link list creating system for creating a link list for a document group having a link relation may comprise a colleting unit, a link importance assigning unit, a URL character string determining unit and an index creating unit. The collecting unit collects a document from a network, a link importance assigning unit assignes a link importance as an importance calculated based on a link relation to the particular document, a URL character string determining unit determines a URL having a characteristic of a particular character string from a URL of the document, and an index creating unit creates a link list for listing less than a predetermined number of linked documents of the document based on the link importance and the characteristic of the particular character string of the URL. The characteristic of a particular character string of the URL of document may represent the content thereof. For example, the URL of document about JAVA may contain a character string such as "JAVA" or "java". Therefore, the characteristic of a particular character string of a URL may be used to estimate the content of document. Thus, when a link list for document is created based on a link importance and the characteristic of a particular URL, a link list that allows document containing contents that the user wants to browse to be searched can be automatically created.

The link list creating system may further comprise a document type determining unit for determining a document type of the particular document corresponding to the URL similarity, the number of documents linking to the document, and the number of documents linked from the document. The index creating unit selects the document based on the document type and creates the link list of the selected document corresponding to the link importance and the characteristic of the character string of the URL. Thus, a link list for more adequate document can be created.

The scope of the present invention includes a method composed of processes accomplished by the above-described apparatuses.

In addition, the scope of the present invention includes a record medium for recording programs that cause the computer to execute the above-described processes.

BRIEF DESCRIPTION OF DRAWINGS

The features and advantages of the present invention will be more clearly appreciated from the following description taken in conjunction with the accompanying drawings in which like elements are denoted by like reference numerals and in which:

FIG. 1 is a schematic diagram showing an example of an obvious pronunciation character input interface;

FIG. 4 is a schematic diagram showing a table set containing keyword information;

FIG. 5 is a schematic diagram showing a table set containing index information;

FIG. 6 is a schematic diagram showing an access log;

FIG. 7 is a flow chart showing an index creating process;

FIG. 12 is a flow chart showing a generating process of an initial keyword character string graph;

FIG. 13 is a schematic diagram showing an example of an algorithm for accomplishing the generating process for the initial keyword character string;

FIG. 14 is a flow chart showing an intermediate node shrinking process;

FIG. 15 is a schematic diagram showing an example of an algorithm for accomplishing the intermediate node shrinking process;

FIG. 17 is a schematic diagram showing an example of an algorithm for accomplishing the terminal node shrinking process;

FIG. 21 is a schematic diagram showing another example of the top index screen;

FIG. 23 is a schematic diagram showing a second example of the intermediate index screen;

FIG. 24 is a schematic diagram showing a third example of the intermediate index screen;

FIG. 26 is a schematic diagram showing another example of the keyword information screen;

FIG. 27 is a block diagram showing the structure of a document searching apparatus according to a second embodiment of the present invention;

FIG. 29 is a block diagram showing the structure of a link list creating system according to a fourth embodiment of the present invention;

FIG. 30 is a block diagram showing the structure of a link list creating system according to a fifth embodiment of the present invention;

FIG. 31 is a block diagram showing the structure of an information processing apparatus; and FIG. 32 is a schematic diagram showing a computer readable record medium and a transfer signal that allow programs and data to be supplied to the information processing apparatus.

DESCRIPTION OF PREFERRED EMBODIMENT

Figure 2:
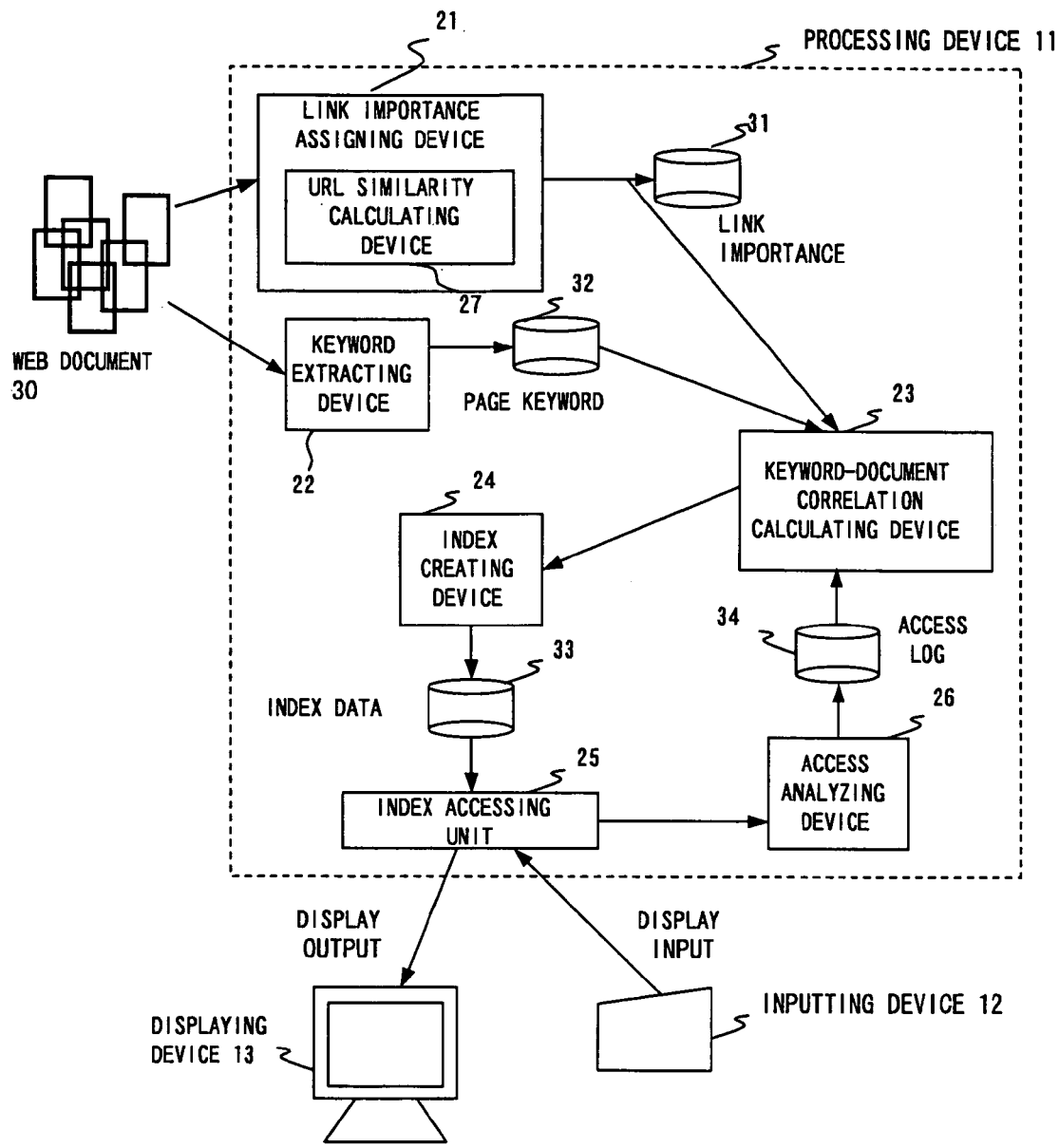
FIG. 2 is a block diagram showing the structure of a document searching apparatus according to a first embodiment of the present invention.

Next, with reference to the accompanying drawings, an embodiment of the present invention will be described. FIG. 2 shows the structure of a document searching apparatus according to a first embodiment of the present invention. Referring to FIG. 2, the document searching apparatus comprises a processing device 11, an inputting device 12, and a displaying device 13. The processing device 11 includes for example a CPU (Central Processing Unit) and a memory. The inputting device 12 corresponds to a keyboard, a mouse, and so forth. The displaying device 13 corresponds to a display and so forth.

The processing device 11 comprises a link importance assigning device 21, a keyword extracting device 22, a keyword-document correlation calculating device 23, an index creating device 24, an index accessing unit 25, and an access analyzing device 26. Those devices correspond to software components described in a program. The software components are stored in predetermined program code segments of the processing device 11.

The link importance assigning device 21 extracts link information from document 30 such as a web page. In the case of a web page, the link importance assigning device 21 analyzes HTML and extracts an anchor (a) tag portion such as <a href="http://www.fujitsu.co.jp/"> Fujitsu Top </a>. The link importance assigning device 21 calculates a link importance 31 based on the extracted link information. The link importance assigning device 21 outputs the calculated link importance 31 to the keyword-document correlation calculating device 23. The link importance assigning device 21 includes a URL similarity calculating device 27. The URL similarity calculating device 27 calculates a URL similarity that represents the similarity of characters of URLs of a document to which a link points and a document data from which a link points. The link importance assigning device 21 calculates the link importance 31 corresponding to the extracted link relation and URL similarity.

The keyword extracting device 22 extracts a keyword from the document 30 and outputs the result as a page keyword 32. The keyword extracting device 22 may totalize all occurrence frequency of the extracted keyword in the document 30. When the document 30 is written in Japanese, the keyword extracting device 22 performs a morpheme analysis (word delimitation) and extracts a noun (string) as a keyword. Simple fluctuations of notations (such as "コンピュータ(computer)" and "コンピューター (computer)" are standardized with rules and a small dictionary. Information of synonyms is given by for example an external dictionary or the like.

The keyword-document correlation calculating device 23 calculates a keyword-document correlation that is a correlation between a keyword and a document based on the link importance 31, the page keyword 32, and an access log 34 (that will be described later) and outputs the calculated result to the index creating device 24.

The index creating device 24 creates the index data 33 based on the keyword-document correlation and outputs the created index data 33 to the index accessing unit 25. The index data 33 is created with ,for example, hypertext.

The index accessing unit 25 displays the content of the index data 33 on the displaying device 13 according to a user's command that is input from the inputting device 12 and outputs information that represents a user's access state to the access analyzing device 26.

The access analyzing device 26 analyzes the information that represents the user's access state and creates the access log 34 that totalizes documents that the user has accessed in a predetermined time period from each keyword and outputs the created access log 34 to the keyword-document correlation calculating device 23.

Next, with reference to FIGS. 3 to 6, the structures of each data will be described.

Figure 3:
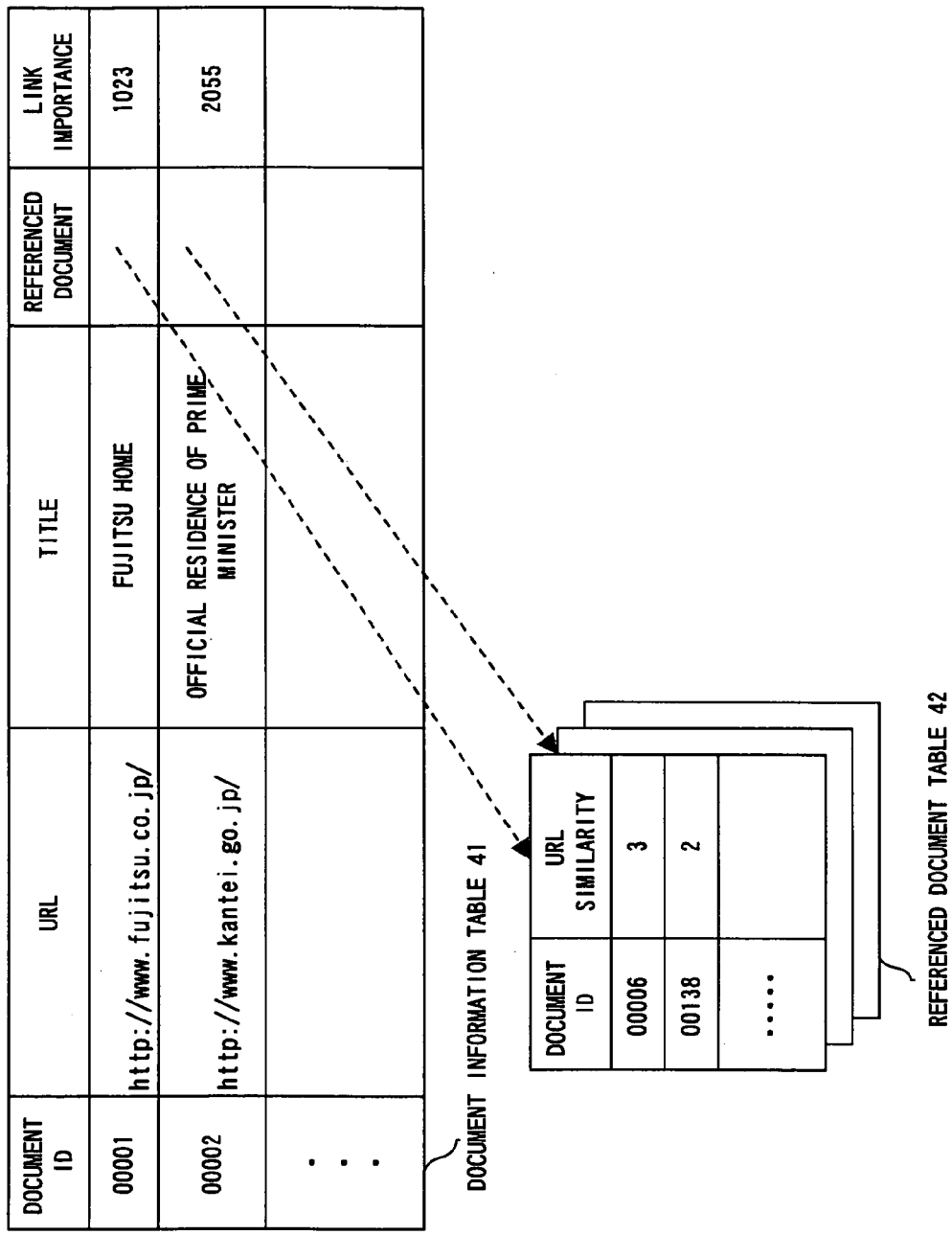
FIG. 3 is a schematic diagram showing a table set containing document information.

FIG. 3 shows a table set containing document information. The table set includes a document information table 41 and a referenced document table 42. The document information table 41 is composed of a document ID filed, a URL field, a title field, a referenced document table link field to a referenced document table 42 and a link importance field and so on. The document ID field contains a set of document IDs uniquely assigned to document. The URL field contains a set of URLs which indicate the location of the document in the network. The title field contains a set of titles of document. The referenced document table 42 contains a set of documents linking to the document. The referenced document table 42 has a document ID field and a URL similarity field. The URL similarity field contains a set of URL similarities between a URL of the document from which a link points and a URL of the document to which a link points. At the most a referenced document table 42 is provided for each document. The document information table 41 and the referenced document table 42 correspond to the link importance 31 generated by the link importance assigning device 21.

FIG. 4 shows a table set that contains keyword information. The table set includes a keyword table 51, a keyword relation table 52, and an occurrence document table 53. The keyword table 51 contains a keyword ID field, a representative word field, and an occurrence document table link field. A representative word is information that represents which one of keywords having the same keyword ID is used as a representative. The keyword relation table 52 contains a keyword field, a pronunciation character (or spelling) field, and a keyword ID field. In the example, keywords that represent the same concept (for example, "コンピュータ(konpyu-ta: meaning computer in Kana characters)", "computer (written in English", and "計算機 (keisanki: meaning computer in Kanji characters)") are assigned the same keyword ID (kwID). In addition, for pronunciation characters of Japanese keywords, notations are standardized (for example, a long sound is removed from pronunciation characters; contracted sounds such as "ぁ (a)" and "ぃ (i)" are denoted by "あ (a)" and "い (i)", respectively). English keywords are denoted in upper case. Thus, keywords that represents the same concept such as "コンピュータ (konpyu-ta: computer)" and "コンピューター (konpyu-ta-: computer)" due to the fluctuations of the notations can be prevented from being treated as different keywords. Thus, in the created index, keywords can be standardized. The occurrence document table 53 contains a document ID field and an occurrence field. The document ID field contains a set of document IDs of document containing the relevant keyword. The occurrence field contains a set of values that represent occurrences of keywords. The processing device 11 (not shown) has the keyword relation table 52 and representative words of the keyword table 51 in advance. The occurrence document table 53 is equivalent to the page keyword 32 generated by the keyword extracting device 22.

FIG. 5 shows a table set that contains index information. The table set includes an index information table 61, a correlated document table 62, and a correlated keyword table 63. The index information table 61 contains an index character string field, a followed character string field, and a correlated keyword string field. The index information table 61 is generated by the index creating device 24. The index creating device 24 creates a character string graph based on keywords, pronunciation characters (spelling) thereof, and keyword documents contained in the keyword relation table 52 and shrinks the character string graph in a particular method that will be described later. Referring to FIG. 5, the index information table 61 shows that "top" is followed by "あ (a)", "い(i)", and so forth and that "あ (a)" is followed by "あいぼ (aibo)", "あお(ao)", and so forth. In addition, the index information table 61 shows that keywords corresponding to a character string "あいぼ (aibo)" are "相棒 (aibou: mate)" and "アイボリー (aibori-: ivory)". Those keywords are contained in the keyword relation table 52 shown in FIG. 5. The correlated document table 62 is a table for obtaining a correlated document ID that is an ID of a related document from the keyword ID. The keyword-document correlation calculating device 23 calculates a document correlation and places a sequence of correlated document IDs in the order of higher document correlation based on the calculated result. The correlated keyword table 63 is a table for obtaining a correlated keyword ID corresponding to a document ID. The content of the correlated document table 62 is the same as the content of the correlated keyword table 63 except that they have the transpose-relation. Detailed information of the correlated document IDs is contained in the document information table 41 shown in FIG. 3.

FIG. 6 shows an access log 71 that is a table containing access log information with which the user has selected document on a keyword information screen (that will be described later) (namely, access date/time, keyword ID, and document ID of selected document). The access log 71 is equivalent to the access log 34 created by the access analyzing device 26. When the log is totalized in a predetermined time period, the number of times a particular document has been accessed can be obtained.

Next, with reference to FIG. 7, the overall operation of the document searching apparatus will be described. FIG. 7 shows the index creating process.

First of all, the link importance assigning device 21 extracts link information, a URL, and so forth from document, writes the extracted information to the document ID field and the URL field, and generates a link (pointer) to the referenced document table 42 in the document information table 41 and the referenced document table 42 itself (at step S1).

The URL similarity calculating device 27 of the link importance assigning device 21 calculates the URL similarity of a document to which a link points and a document from which a link points based on the extracted link information and URL and writes the calculated URL similarity to the URL similarity field of the referenced document table 42.

Thereafter, the link importance assigning device 21 calculates the link importance based on the extracted link information and the calculated URL similarity and writes the calculated link importance to the link importance field of the document information table 41 (at step S2). The calculating methods for the URL similarity and the link importance will be described later.

The keyword extracting device 22 extracts keywords from the document 30 and writes them to the keyword field and the keyword ID field of the keyword relation table 52, all the fields of the keyword table 51, and the document ID field and the frequency field of the occurrence document table 53 (at step S3). When the document 30 is written in Japanese, the keyword extracting device 22 performs a morpheme process (word delimitation) for the document 30 and extracts the keywords from the obtained nouns (strings). In addition, the simple fluctuations of notations (such as "コンピュータ (konpyu-ta: computer)" and "コンピューター (konpyu-ta-: computer)" are standardized with rules and a small dictionary. Information of synonyms are given by for example an external dictionary or the like.

The keyword extracting device 22 assigns pronunciation characters of the extracted keywords based on the above-described standardized notation rules and writes the pronunciation characters to the pronunciation character (spelling) field (at step S4). Since the keyword relation table 52 contains standardized notations of keywords, keywords can be standardized in a created index.

The keyword extracting device 22 totalizes all occurrence frequencies of the extracted keywords of the document 30, generates pointers to the occurrence document field of the keyword table 51, and writes the totalized frequencies to the document ID field and the frequency field of the occurrence document table 53 (at step S5). In addition, the keyword extracting device 22 totalizes all occurrence frequencies of the keyword IDs, determines a predetermined number of keywords (for example, 10,000 keywords) in order of higher occurrence frequencies as keywords of the index, and deletes entries for keyword IDs other than the selected keyword IDs from the keyword table 51 and the keyword relation table 52.

Thereafter, the keyword-document correlation calculating device 23 calculates a keyword-document correlation that represents the correlation between the keywords and the documents based on the link importance field of the document information table 41, the URL similarity field of the referenced document table 42, and the access log 71, determines a predetermined number of documents in the order of higher keyword-document correlation as correlated documents, and writes the determined correlated documents to the correlated document ID string fields of the correlated document table 62 and the correlated keyword table 63 (at step S6).

Thereafter, the index creating device 24 creates a character string graph based on the entry keywords and the pronunciation characters (spelling) of the keyword relation table 52, shrinks the character string graph, and writes the result to the index information table 61 (at step S7). The shrinking process will be described later.

Thereafter, the index creating device 24 creates an index based on the index information table 61, the correlated document table 62, the correlated keyword table 63, and the document information table 41 (at step S8). The index is generated as for example hypertext. The created index may be displayed on the displaying device 13.

The created index is output to the displaying device 13 through the index accessing unit 25. The user inputs data using the index that appears on the displaying device 13. The index accessing unit 25 outputs information that represents the access state of the user to the access analyzing device 26. The access analyzing device 26 analyzes the information that represents the access state and generates the access log 34 (not shown).

Next, a link importance calculating process performed by the link importance assigning device 21 of the document searching apparatus will be described.

According to the embodiment, when the link importance assigning device 21 assigns a link importance to document, the link importance assigning device 21 uses the link relation, the URL, and the keywords thereof. The importance of document determined based on the link relation is referred to as link importance. The link importance is determined mainly based on the following rules:

Document (page) linked from many documents with URLs that have lower similarities is important.

For example, although a plurality of web pages contained in the same site are linked to the other pages of the site, their URLs are similar to each other. Thus, it can be estimated that the importance of a page linked from a page with a URL that has a higher similarity is low.

A page that is linked from many pages is important. In addition, a page that is linked from an important page and that has a lower URL similarity is important.

For example, although famous directory services and public agencies are linked from many page. It is assumed that the importance of a page linked from such important pages is higher than the importance of a document linked from a page contained in a personal site and an entry page of its contents. In addition, a page in a service (site) containing many pages and a page contained in a mirror site are often linked to pages contained in such sites. Thus, as a problem of the related art references, many pages contained in the same site tend to be searched. However, since the URLs, for example the domain name, of pages contained in the same site are often similar, when a rule of which "a page having a low URL similarity is important" is used, such a problem can be solved.

URL similarity is defined based on characters of a URL so that the lowest URL similarity is assigned to pages whose server addresses, paths, and file names are different each other, whereas a high URL similarity is assigned to a page contained in a mirror site or the same server.

Using the above-described three rules, all the link relations are not identically treated. Instead, the link relation is weighted corresponding to the importance. Specifically, a link weight is assigned as the reciprocal of the URL similarity of a page to which a link points and a page from which the link points. Thus, a problem of the related art reference of which the importance of a page (document) is determined based on only the number of other pages linking to the page (the number of times a link is made from other pages) (namely, the importance of a server, a personal site, or a mirror site that contains a large number of pages is high) can be solved. In addition, even if the number of pages contained in a site is maliciously increased and linked, since the URL similarity of pages contained in the same site is high, it is more difficult to control the importance of the pages than before.

Next, the calculating process of the link importance by the link importance assigning device 21 will be described in detail.

When a page p links to a page q, the link weight lw(p, q) is defined by the following formula (1).

$$lw(p, q) = diff(p, q) \bigg/ \sum_{i \in Ref(p)} diff(p, i) = \frac{1}{sim(p, q) \sum_{i \in Ref(p)} \frac{1}{sim(p, i)}} \quad (1)$$

where a set of pages calculated for the link importance is DOC={p1, p2, . . . , pN}; the link importance of the page p is Wp; a set of pages linked from the page p is Ref(p); a set of pages linked to the page p is Refed(p); the URL similarity of the pages p and q is sim(p, q); the difference is diff(p, q)=1/sim(p, q).

As is clear from the formula (1), the value of lw(p, q) is reversely (or inversely) proportional to the URL similarity sim(p, q) of the pages p and q and to the number of pages linked from the page p.

Assuming that Cq is constant (the lower limit of the importance, it is possible to set different value according to page) for each p∈DOC, the link importance of each page is defined as a solution of the following simultaneous linear equation.

$$Wq = Cq + \sum_{p \in Refed(q)} Wp * lw(p, q) \quad (2)$$

The link importance assigning device 21 solves the simultaneous linear equation and assigns the link importance to each page. The simultaneous linear equation can be solved by one of conventional algorithms. Thus, the description of the simultaneous linear equation is omitted. The URL similarity sim(p, q) of the formula (1) is calculated by the URL similarity calculating device 27 of the link importance assigning device 21 (that will be described later). The formulas (1) and (2) accomplish the above-described rules. According to the formula (1), the similarity is reversely proprotional to the weight lw. Thus, according to the formula (2), a page linked from many URLs having lower similarities is important. In addition, according to the formula (2), a page linked from many pages is important.

In addition, according to the formula (2), a page that has a low URL similarity (a high link weight lw) and that is linked from an important page (Wq) is important. Next, with reference to FIGS. 8 and 9, the concepts expressed by the formulas (1) and (2) will be described in detail.

Figure 8:
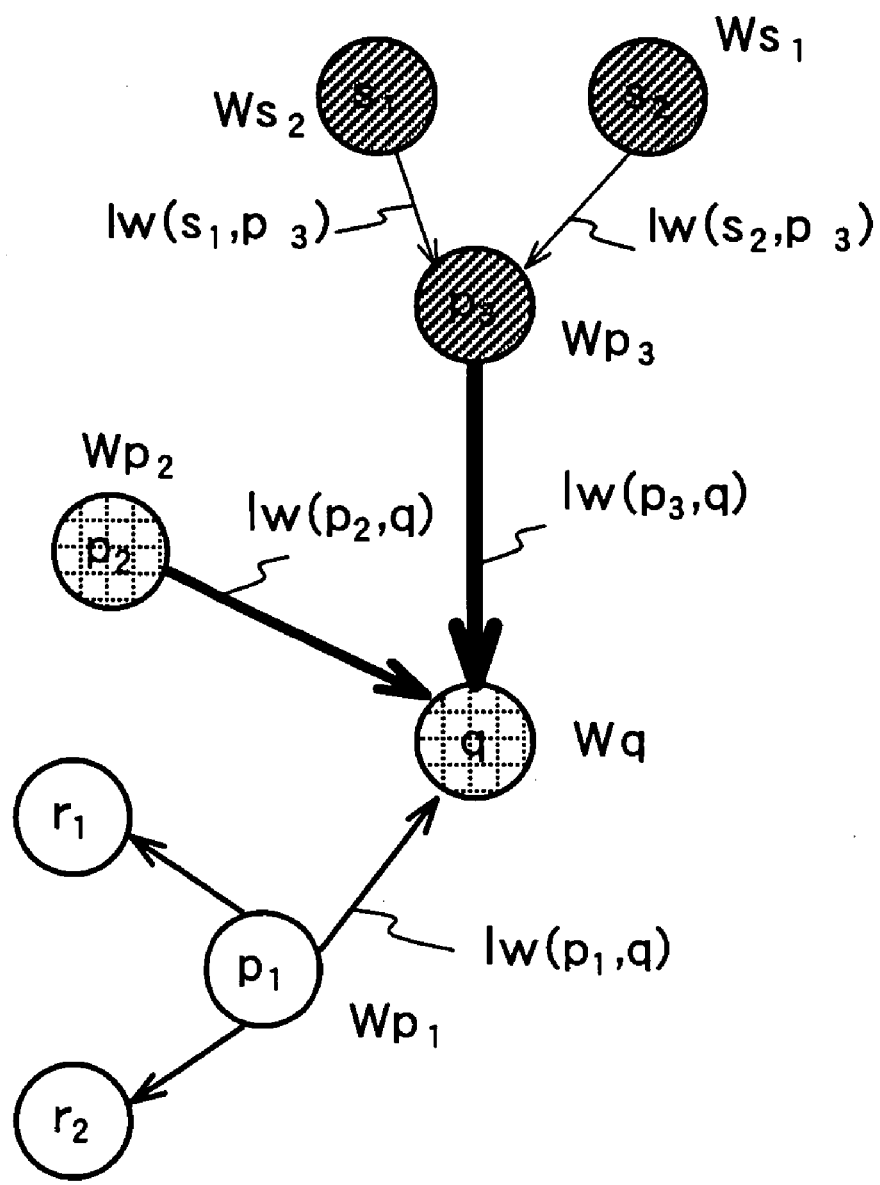
FIG. 8 is a schematic diagram showing calculations performed by a link importance assigning device.

FIG. 8 shows the concepts expressed by the formulas (1) and (2). In FIG. 8, each circle represents a page; each arrow represents a link relation; a page to which an arrow points is a page linked from another page, a page from which an arrow emerges is a page linking to another page and the thickness of each arrow represents a link weight. As shown in FIG. 8, pages p1, p2, and p3 link to a page q. The page p1 also link to two pages r1 and r2 other than the page q. Likewise, the page p3 is linked from two pages s1 and s2.

The URL similarity of each page is expressed as follows:
sim(p1, q)=sim(p1, r1)=sim(p2, r1)=1
sim(p2, q)=2 (In other words, the URL of the page p2 is slightly different from the URL of the page q.)
sim(p3, q)=1, sim(s1, p3)=sim(s2, p3)=3 (In other words, the URLs of the pages s1, s2, and p3 are similar to each other.)

When the formulas (1) and (2) are applied to the case shown in FIG. 8, the link weights of the pages p1, p2, p3, s1, and s2 are expressed as follows:

$$lw(p1, q)=1/\{1\times(1+1+1)\}=\tfrac{1}{3}$$

$$lw(p2, q)=1/\{2\times(\tfrac{1}{2})\}=1$$

$$lw(p3, q)=1$$

$$lw(s1, p3)=lw(s2, p3)=\tfrac{1}{3}$$

Thus, according to the formula (1) and the above-described calculation results, it is clear that the link weight $lw(p1, q)$ of the page p1 that links to many pages is small. Likewise, according to the formula (1) and the above-described calculation results, as the URL similarity decreases, the link weight increases.

In addition, the link importance $W_q$ of the page q is expressed as follows.

$$W_q=C_q+\{lw(p1, q)\times W_{p1}+lw(p2, q)\times W_{p2}+lw(p3, q)\times W_{p3}\}$$

$$=C_q+\{(W_{p1}/3)+W_{p2}+W_{p3}\}$$

$$W_{p1}=C_{p1}$$

$$W_{p2}=C_{p2}$$

$$W_{p3}=C_{p3}+\{lw(s1, p3)\times W_{s1}+lw(s2, p3)\times W_{s2}\}$$

$$=C_{p3}+(W_{s1}+W_{s2})/3$$

Thus, the link importance $W_{p3}$ of the page p3 that is linked from more pages is higher than the link importance of each of the pages p1 and p2. In addition, it is clear that the link importance $W_q$ of the page q is high (namely, the page q is an important page). As the URL similarity decreases, the link weight increases. Then the link importance of $lw(p3,q)$ becomes high. In addition, according to the formula (2) and the above-described calculation results of link weight of page q, the link weights of pages that are contained in the same site and that have similar URLs are lower than the link weights of pages that have not similar URLs. Thus, it is clear that too many pages of sites that contain a large number of pages can be prevented from being obtained as search results.

Figure 9A:
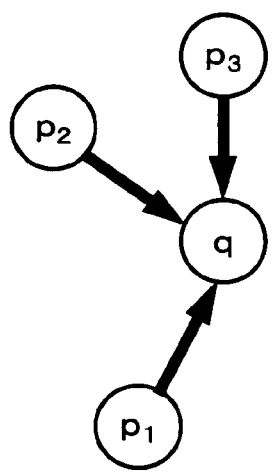
FIG. 9A is a schematic diagram showing a link importance in the case that the URL similarity of pages is low.
Figure 9B:
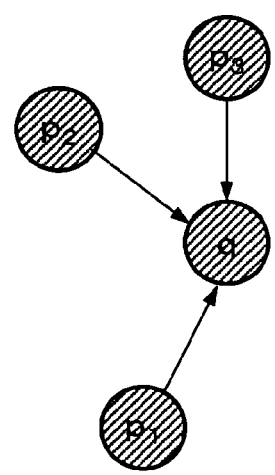
FIG. 9B is a schematic diagram showing a link importance in the case that the URL similarity of pages is high.

FIGS. 9A and 9B show concepts of the formulas (1) and (2). FIG. 9A shows a link importance in the case that the URL similarity of each page is low. FIG. 9B shows a link importance in the case that the URL similarity of each page is high. Likewise, in FIGS. 9A and 9B, each circle represents a page; each arrow represents a link relation; the direction of each arrow represents a link direction; and the thickness of each arrow represents a link weight. In FIG. 9B, each shaded circuit represents a page having a high URL similarity. In FIGS. 9A and 9B, a page q is linked form pages p1, p2, and p3. In FIG. 9B, the URL of the page q is similar to the URLs of pages p1, p2, and p3. The URL similarity sim(pi, q) is n+1 (where n is an integer). The formulas (1) and (2) are applied to each of the cases shown in FIGS. 9A and 9B. In the case shown in FIG. 9A, the following relations are satisfied.

The link weight of each page can be expressed as follows:

$$lw(pi, q)=1/sim(pi, q)=1 \text{ (where URLs are not similar).}$$

The link importance $W_q$ of the page p can be expressed as follows:

$$W_q=C_q+(W_{p1}+W_{p2}+W_{p3})$$

In the case shown in FIG. 9B, the following relations are satisfied.

The link weight of each page can be expressed as follows:

$$lw(pi, q)=1/sim(pi, q)=1/(n+1) \text{ (where the URLs are similar.)}$$

The link importance $W_q$ of the page q can be expressed as follows:

$$W_q=C_q+(W_{p1}+W_{p2}+W_{p3})/(n+1)$$

Thus, when the calculated results are compared in each of the cases shown in FIGS. 9A and 9B, if the URL similarity sim(p, q) is high, even if the number of pages linking to the page q is large, it is clear that the link importance $W_q$ of the page q is low. Thus, using the URL similarity, the problem of which the importance of a server (site) or the like that contains a large number of pages became high only because it has many pages can be solved.

Next, the URL similarity sim(p, q) of the pages p and q in the formulas (1) and (2) will be described. The URL similarity is calculated by the URL similarity calculating device 27 of the link importance assigning device 21.

Generally, the URL of a page is composed of three types of information that are a server address, a path, and a file name. For example, the URL of a web page, "http://www.flab.fujitsu.co.jp/hypertext/news/1999/product1.html", is composed of a server address "www.flab.fujitsu.co.jp", a path "hypertext/news/1999", and a file name "product1.html".

In addition, a server address is hierarchically structured using dots "." in such a manner that the last element represents the highest (widest) hierarchical level. For example, in the server address "www.flab.fujitsu.co.jp", elements Japan "jp", corporation "co", Fujitsu "fujitsu", Fujitsu laboratory "flab", and machine "www" successively represent higher hierarchical levels.

According to the embodiment of the present invention, the URL similarity of two given pages p and q is defined in a combination of the above-described three elements. As the similarity sim(p, q), a domain similarity sim_domain(p, q) and a merged similarity sim_merge (p, q) can be considered.

The domain similarity sim_domain(p, q) is calculated based on the similarity of domains. A domain is the second half protion of the server address. A domain represents a company or an organization. In the case of a server in USA, a server address ending with ".com", ".edu", ".org", or the like, the last two elements of the server address represent a domain. In the case of a server used outside USA, a server address ending with "jp", "fr", or the like, the last three elements of the server address represent a domain. For example, the domain of "www.fujitsu.com" is "fujitsu.com". The domain of "www.flab.fujitsu.co.jp" is "fujitsu.co.jp".

Figure 10:
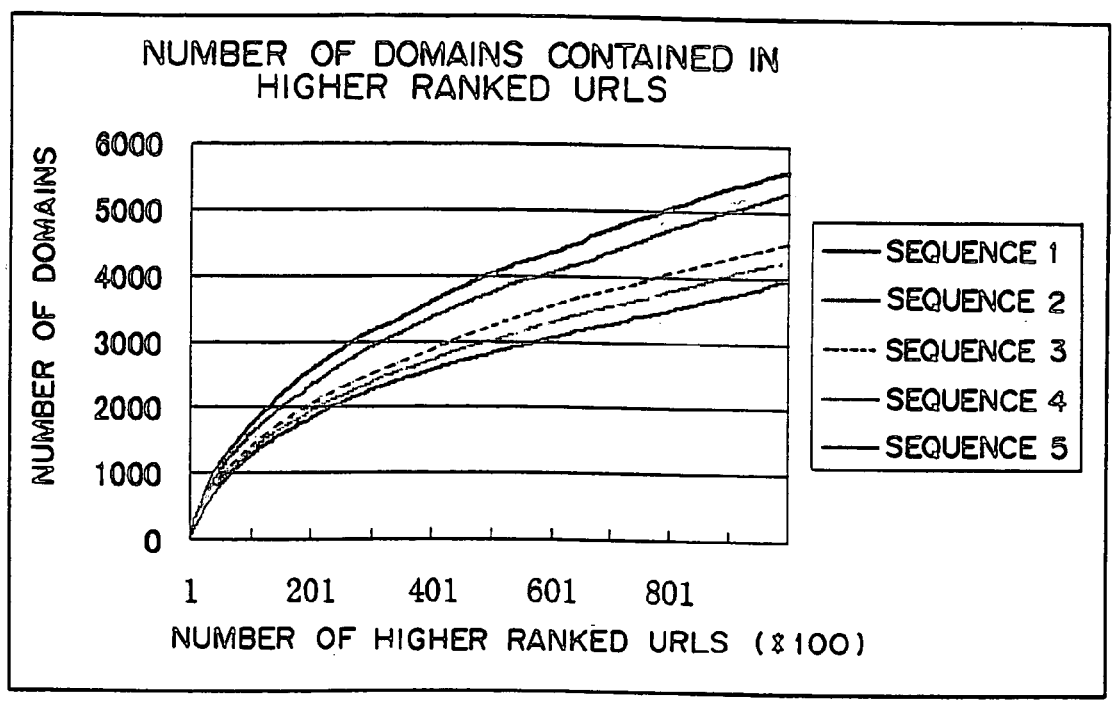
FIG. 10 is a schematic diagram showing a result of which the concept of a URL similarity is introduced for calculating a link importance.

The domain similarity of the page p and the page q is defined by the following formula (3).

$$\text{sim\_domain}(p, q) = 1/\alpha \text{ (in the case that the domain of the page } p \text{ is the same as the domain of the page)} = 1 \text{ (in the case that the domain of the page } p \text{ is different from the domain of the page)} \quad (3)$$

wherein $\alpha$ is a constant that is a real value larger than 0 and smaller than 1. FIG. 10 shows the case that a link importance is calculated using the concept of the domain similarity sim_domain(p, q) in the link relation of around 3,000,000 URLs collected from the Internet. In FIG. 10, the horizontal axis represents the order of pages in the order of higher link importance, whereas the vertical axis represents the number of pages having different domains contained in higher ordered pages. In FIG. 10, sequences 1 to 5 represent the cases that the values of $\alpha$ are 0.1, 0.2, 0.3, 0.5, 0.7, and 1.0, respectively. When the value of $\alpha$ is 1 (namely, in the case of the related art reference of which the URL similarity is not used), the number of pages that contain different domains contained in 100,000 pages having higher link importance is 4000. When the value of $\alpha$ is 0.1, the number of pages is 5500. Thus, it is clear that as the value of $\alpha$ becomes small, the link importance of a page having a different domain becomes high. The smaller the value of $\alpha$ becomes, the higher the URL similarity sim_domain(p, q) becomes. Then the URL similarity sim_domain(p, q) becomes higher, and the link weight lw(p, q) becomes lower. Thus, since the link importance $W_q$ becomes small. Consequently, the URL similarity becomes large, a small link importance is assigned to a page. Using the concept of sim_domain(p, q), pages having different domains tend to be searched. In other words, pages having the same domain names are not easily searched.

As sim(p, q), similarity sim_merge(p, q) of which the above-described three types of information are merged is defined as follows:

$$\text{sim\_merge}(p, q) = (\text{similarity of server addresses}) + (\text{similarity of paths}) + (\text{similarity of file names})$$

Next, the calculating method of each element of the right side will be described.

The similarity of server addresses is determined from the later hierarchical levels. When the server addresses are matched up to the n-th hierarchical level, the similarity is (1+n). When "www.fujitsu.co.jp" and "www.flab.fujitsu.co.jp" are compared, since they are matched up to the third level, the similarity is 4. On the other hand, when "www.fujitsu.co.jp" and "www.fujitsu.com" are compared, since they are not matched in any hierarchical level (no match level), the similarity is 1.

The similarity of paths is determined for each element delimited by "/" from the beginning. The similarity is represented by the number of levels in which the elements are matched. When "/doc/patent/index.html" and "/doc/patent/1999/2/file.html" are compared, since they are matched up to the second levels, the similarity is 2.

The similarity of file names is determined by comparing the file names. When the file names are matched, the similarity is 1.

The above-described determinations are based on the following rules.

Since similar documents are often placed in the same directory, documents with URLs whose paths are the same in the same server are often similar.

The similarity of mirror sites used to disperse accesses is high. In the case, only serer address portions are different. The remaining path and file names are often the same.

The similarity of URLs whose server addresses, paths, and file names are different is low.

Using sim_merge(p, q), pages having similar URLs can be prevented from being searched. Thus, by applying the concept of sim(p, q) or diff(p, q) to lw(p, q), the problem that the link importance of a server or a personal site that has a large number of pages becomes high just because of its number of pages, can be solved.

The above-described link importance $W_p$ can be also used for calculating a correlation that will be described later.

Next, the correlation calculating process performed by the keyword-document correlation calculating device 23 of the document searching apparatus will be described.

When an index of documents is created using keywords, the correlation between keywords and documents is required. The correlation is defined as follows.

The more keywords a document has, that is the greater degree of keywords a document has, the higher the correlation between the document and the keyword.

The document with a higher importance has a higher correlation.

It is preferred that the number of correlated documents corresponding to a particular keyword is limited (for example, it is not preferred to obtain 1000 correlated documents with one keyword).

According to the embodiment of the present invention, to limit the number of correlated documents corresponding to a particular keyword, in addition to the above-described concepts, the following concepts are used.

Correlation based on analysis of user's access log: The correlation of a document between a keyword becomes higher when the document is often accessed using the keyword in a predetermined period.

Correlation of documents based on link importance: The correlation of documents including a keyword, which has high link importance, is high.

Using the above-described concepts, the correlation of a page p using a particular keyword w can be expressed by the following formula (4).

$$\text{Rel}(p, w) = TF(p, w) * \log Wp * \log (AC(p, w) + 2) \quad (4)$$

where $TF(p, w)$ is the number of occurrences of the keyword w in the page p; Wp is the link importance of the page p that is equivalent to Wp of the formula (2); and $AC(p, w)$ is the number of times the page p is accessed with the keyword w in a predetermined time period (for example, in one month or one week).

A predetermined number of pages having higher values of Rel(p, w) for each keyword are treated as correlated pages.

In addition to the number of occurrences of a keyword, the link importance Wp and the user's access log are used to calculate the correlation. Thus, there are many conditions that cause the correlation of pages to become high. Consequently, it becomes more difficult for a malicious third party to change the content of a page for obtaining a high correlation of the page.

Next, an index created by the index creating device 24 (namely, a keyword selecting interface to search for a page) will be described. With the keyword selecting interface according to the embodiment, the user can select a keyword by successively clicking portions of pronunciation characters thereof. The interface especially works well for languages using Kanji such as Japanese, Chinese and so on. The interface has the following features:

On one screen, portions (characters or character strings) of the pronunciation characters of a keyword and a part of the keyword corresponding to the pronunciation characters thereof of the keyword that has been selected appear.

When the user successively clicks portions (characters or character strings) of the pronunciation characters of a keyword on the screen, he or she can select the keyword.

The number of keywords that appear on one screen can be limited.

According to the related art references, the user clicks one character at a time so as to select the pronunciation characters of a keyword. In contrast, according to the embodiment of the present invention, the user may click a character string instead of a character at a time. Thus, the number of times of the clicking operation can be decreased for selecting a keyword. In addition, since the number of keywords that appear on one screen is limited, the user can easily select a keyword. When the number of keywords that appear on one screen is limited, the user can easily select a keyword on a narrow screen of a mobile terminal unit such as a cellular phone. To do that, the index creating device 24 performs the following operation.

The pronunciation characters (spelling) of keywords are standardized. When necessary, a long sound is deleted from pronunciation characters. In addition, contracted sounds such as "秋葉原 (a)" and "い (i)" are denoted by "秋葉原 (a)" and "い (i)", respectively.

An oriented graph (character string graph) of which pronunciation characters are nodes and a set of keywords are leaves is created corresponding to keywords and their pronunciation characters (or spelling).

With the graph, the following shrinking operation is performed:

(a) Paths are shrunk to leaves.
(b) Intermediate paths are deleted.
(c) A keyword of a child node is placed in a parent node and the child node is deleted.

Next, a keyword character string graph creating process performed by the index creating device 24 will be described.

Figure 11A:
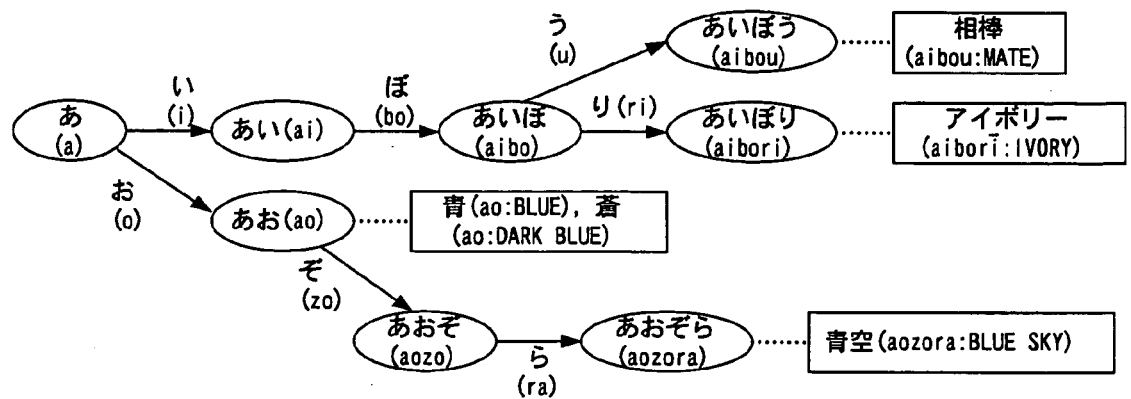
FIG. 11A is a schematic diagram showing an example of an initial keyword character string graph.
Figure 11B:
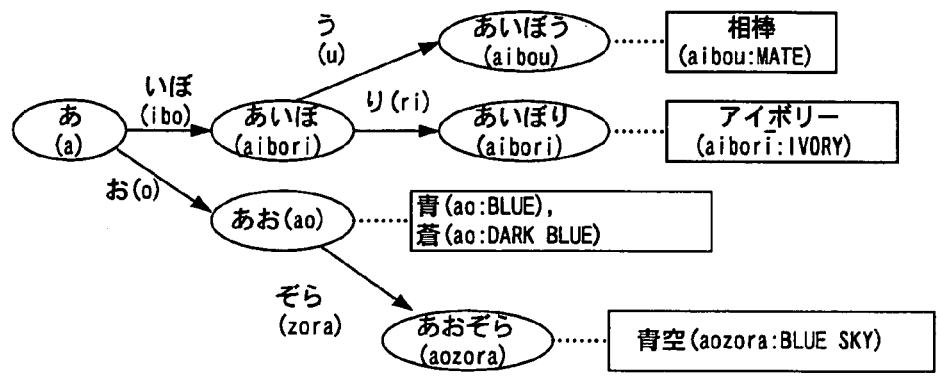
FIG. 11B is a schematic diagram showing an example of a character string graph of which intermediate paths have been shrunk.
Figure 11C:
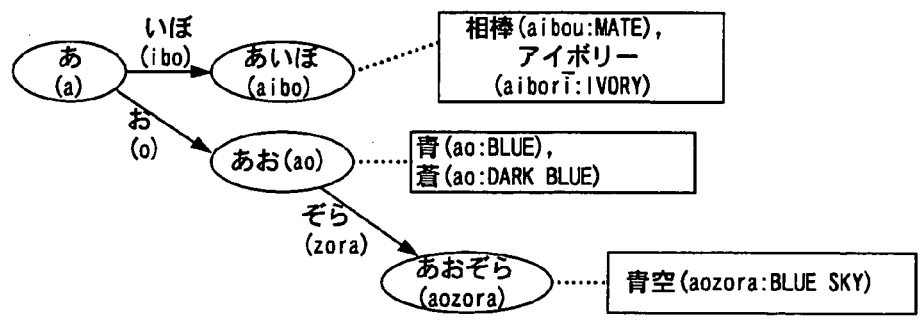
FIG. 11C is a schematic diagram showing an example of a character string graph of which terminal nodes have been shrunk.

A keyword character string graph is a directed graph that represents the pronunciation characters of a keyword. FIG. 11A shows an example of an initial keyword character string graph. FIG. 11B shows an example of a character string graph of which intermediate paths have been shrunk. FIG. 11C shows an example of a character string graph of which terminal nodes have been shrunk.

A keyword character string graph can be represented with six elements:

(N, C, KW, t, nk, yomi)

where N is a set of nodes; C is a set of Kana characters; KW is a set of keywords; t is a transition function of N*C⁺→N node; C⁺ is a label (namely, a string of at least one Kana character represented with arrows of solid lines in character string graphs shown in FIGS. 11A to 11C); nk is a keyword assigned to N→W⁺ node (denoted by dotted lines in FIGS. 11A to 11C); and yomi is the pronunciation characters of a N→C⁺ node.

In FIG. 11A, each set and function are as follows (since yomi is obvious, it is omitted).

N={top, "あ(a)", "あい(ai)", "あいぼ(aibo)", "あいぼう(aibou)", "あいぼり(aibori)", "あお(ao)", "あお(aozo)", "あおぞら(aozora)"}

C={"あ(a)", ... "ん(n)"}

KW={"青 ao: blue)", "蒼(ao: dark blue)", "青空(aozora: blue sky)", "アイボリー(aibori: ivory)"} t (top, あ(a))="あ (a)",
t (あ(a), い(i))="あい(ai)",
t (あ(a), お(o))="あお(ao)",
t (あい(ai), ぼ(bo))="あいぼ(aibo)",
t (あいぼ(aibo), う(u))="あいぼう(aibou)",
t (あいぼ(aibo), り(ri))="あいぼり(aibori)",
t (あお(ao), ぞ(zo))="あおぞ(aozo)",
nk (あいぼう(aibou))={"相棒(aibou: mate)"}
nk (あいぼり(aibori))={"アイボリー(aibori: ivory)"}
nk (あお(ao))={"青 (ao: blue)", "蒼(ao: dark blue)"}
nk (あおぞら(aozora))={"青空(aozora: blue sky)"}

When a keyword and its pronunciation characters are supplied to the index creating device 24, it creates an initial keyword character string graph based on the keyword and its pronunciation characters. FIG. 12 shows the initial keyword character string graph creating process. Next, with reference to FIG. 12, the initial keyword character string graph creating process performed by the index creating device 24 will be described. FIG. 13 shows an example of an algorithm that accomplishes the initial keyword character string graph generating process.

First of all, the index creating device 24 creates a set of keywords, KW (at step S11). Thereafter, the index creating device 24 determines whether the created set KW is null. When the set KW is null (namely, the determined result at step S12 is Yes), since it is not necessary to create character strings, the index creating device 24 completes the process. When the set KW is not null (namely, the determined result at step S12 is No), the flow advances to the next step.

Next, the index creating device 24 extracts a particular keyword u from the set KW (at step S13). The index creating device 24 designates the yomi (u) of the keyword u and the node nk {yomi (u)} of the pronunciation yomi (u) and adds the node nk {yomi (u)} as a terminal node (at step S14).

The index creating device 24 determines whether or not the process of step S14 is repeated for the length of the character string of the keyword u (namely, whether or not the keyword u is null) (at step S15). When the keyword u is null (namely, the determined result at step S15 is Yes), since the process for the keyword u is completed, the flow returns to step S12. At step S12, the index creating device 24 extracts another keyword u from the set KW and repeats the process after step S13. When the keyword u is not null (namely, the determined result at step S15 is No), the index creating device 24 extracts the last character from the keyword u (at step S16). Thereafter, the index creating device 24 changes the node to the preceding parent node (at step S17). Thereafter, the index creating device 24 considers the preceding character of the extracted character of the keyword u (at step S18). Thereafter, the flow returns to step S15.

As a result, the index creating device 24 obtains a keyword list assigned to the nodes as the set nk. In addition, the index creating device 24 obtains a list of lower nodes of a particular node as t.

FIG. 11A shows the initial keyword character string graph created by the above-described process. Referring to FIG. 11A, the initial keyword character string graph is created with the following keywords and pronunciation characters.

蒼(ao: dark blue): あお(ao),

青(ao: blue): あお(ao),

青空(aozora: blue sky): あおぞら(aozora),

相棒(aibou: mate): あいぼう(aibou),

アイボリー(aibori: ivory): あいぼり(aibori)

Likewise, FIG. 11A shows the following relations in an algorithm init_kw_graph ( ) algorithm shown in FIG. 13.

@KW={蒼 (ao: dark blue), 青(ao: blue), 青空(aozora: blue sky), 相棒(aibou: mate), アイボリー(aibori: ivory)}
yomi {蒼(ao: dark blue)}=あお(ao), yomi {青(ao: blue)}=あお(ao), yomi {青空(aozora: blue sky)}=あおぞら(aozora), yomi {相棒aibou: mate)}=あいぼう (aibou), yomi={アイボリー(aibori: ivory)}=あいぼり (aibori).

After the index creating device 24 has created the initial keyword character string graph, the index creating device 24 shrinks the character strings. Next, the shrinking process of character strings will be described. The shrinking process is composed of two operations:
Intermediate nodes are shrunk.
Terminal nodes are placed in parent nodes.

First of all, the shrinking process for intermediate nodes by the index creating device 24 will be described. FIG. 14 shows the shrinking process for intermediate nodes. Next, with reference to FIG. 14, the shrinking process for intermediate nodes will be described. FIG. 15 shows an example of an algorithm that accomplishes the shrinking process for intermediate nodes.

First of all, the index creating device 24 creates a set of nodes, N (at step S21). Thereafter, the index creating device 24 determines whether or not the set N is null (at step S22). When the set N is null (namely, the determined result at step S22 is Yes), since it is not necessary to shrink nodes, the index creating device 24 completes the process. When the set N is not null (namely, the determined result at step S22 is No), the index creating device 24 obtains a node n of the set N (at step S23). The index creating device 24 determines whether the node n is followed by only one node and the node n does not contain a keyword (at step S24). When the two conditions are satisfied (namely, the determined result at step S24 is Yes), since the node n can be shrunk, the index creating device 24 deletes the node n from the keyword character string graph at step S25. Thereafter, the flow returns to the step S22. When the two conditions are not satisfied (namely, the determined result at step s24 is No), since the node n cannot be shrunk, the index creating device 24 does not delete the node n. Thereafter, the flow returns to step S22.

As described above, in the keyword character string graph, an intermediate node that satisfies two conditions "no keyword is assigned to the node" and "the node is followed by only one node (child node)" is shrunk. In the initial keyword character string graph shown in FIG. 11A, a node "あい(ai)" and a node "あおぞ(aozo)" are intermediate nodes that satisfy the two conditions "no keyword is assigned to the node" and "the node is followed by only one node (child node)". FIG. 11B shows the result of which intermediate nodes of the initial keyword character string graph shown in FIG. 11A are shrunk. In FIG. 11B, the intermediate nodes "あい(ai)" and "あおぞ(aozo)" are deleted. Likewise, in the algorithm proc_shrink_middle ( ) shown in FIG. 15 the following transition functions and node keywords are applied.

t {" "}=あ(a)+
t {"あ(a)"}=あいぼ(aibo)+あおao)+
t {"あいぼ(aibo)"}=あいぼう(aibou)+あいぼり(aibori)+
t {"あおao)"}=あおぞ(aozo)+
nk {"あいぼう(aibou)"}=相棒aibou: mate)+
nk {"あいぼり(aibori)"}=アイボリ(aibori: ivory)+
nk {"あおao)"}=青ao: blue)+蒼(ao: dark blue)+
nk {"あおぞら(aozora)"}=青空(aozora: blue sky)+

Figure 16:
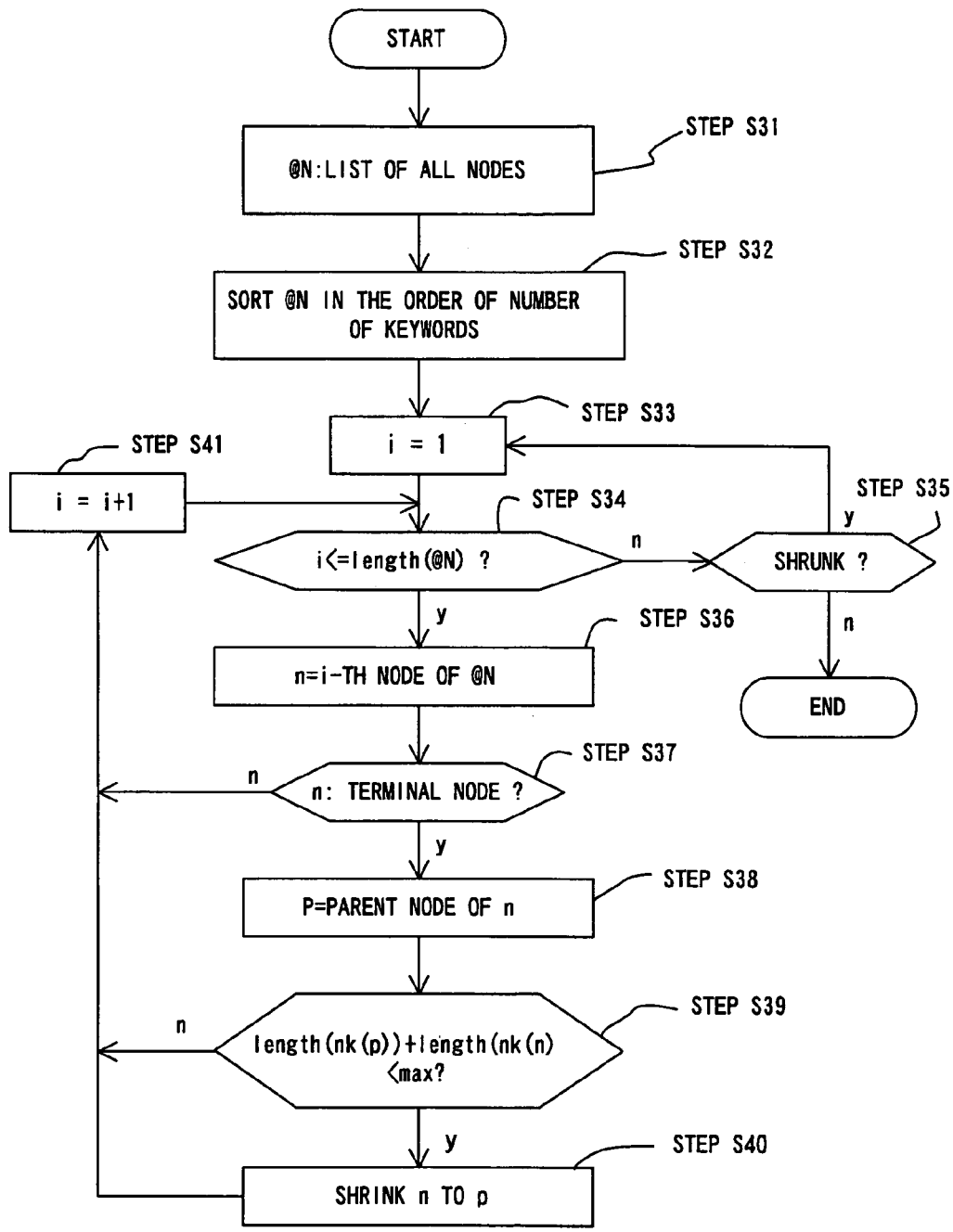
FIG. 16 is a flow chart showing a terminal node shrinking process.

Next, the shrinking process for terminal nodes performed by the index creating device 24 will be described. FIG. 16 shows the shrinking process for terminal nodes. Next, with reference to FIG. 16, the shrinking process for terminal nodes will be described. FIG. 17 shows an example of an algorithm that accomplishes the shrinking process for terminal nodes.

First of all, the index creating device 24 creates a set of all nodes, N (at step S31). Thereafter, the index creating device 24 sorts the nodes in the order of the number of keywords contained therein (at step S32). The index creating device 24 sets an integer i to 1 (at step S33) Thereafter, the index creating device 24 determines whether or not the integer i is smaller than the number of nodes of the set N (at step S34). When the integer i is not smaller than the number of nodes of the set N (namely, the determined result at step S34 is No), the index creating device 24 determines whether or not a terminal node is shrunk (at step S35). When the terminal node is not shrunk (namely, the determined result at step S35 is No), the index accessing unit 25 completes the process. When the terminal node is shrunk (namely, the determined result at step S35 is Yes), the flow returns to step S33.

When the integer i is smaller than the number of nodes of the set N (namely, the determined result at step S34 is Yes), the index creating device 24 obtains the i-th node n of the set N (at step S36). Thereafter, the index creating device 24 determines whether or not the obtained node n is a terminal node (at step S37). When the obtained node n is a terminal node (namely, the determined result at step S37 is Yes), the flow advances to step S38. When the obtained node n is not a terminal node (namely, the determined result at step S37 is No), since the terminal node is a node to be shrunk, the index creating device 24 increments the integer i by 1 (at step S41). Thereafter, the flow returns to step S34.

In the case of yes at step S37, the index creating device 24 obtains the parent node p of the node n (at step S38). Next, the index creating device 24 determines whether or not the sum of the number of keywords contained in the parent node p and the number of keywords contained in the child node n exceeds a predetermined value (at step S39).

When the sum of the number of keywords contained in the parent node p and the number of keywords contained in the child node n does not exceed the predetermined value (namely, the determined result at step S39 is Yes), the index creating device 24 deletes the child node n (namely, the index creating device 24 shrinks the child node n) and places the keywords contained in the child node n in the parent node p (at step S40). Thereafter, the index creating device 24 increments the integer i by 1 (at step S41). Thereafter, the flow returns to step S34.

When the sum of the number of keywords contained in the parent node p and the number of keywords contained in the child node n exceeds the predetermined value, if the child node n is shrunk, the number of keywords contained in the parent node p becomes excessive, the index creating device 24 does not shrink the child node n. Thereafter, the flow advances to step S41.

When the keyword information contained in a terminal node is transferred to the parent node thereof, the depth of tree (chain of nodes) is decreased. Thus, the user can select a desired keyword by clicking a small number of characters (character strings). However, if too many keywords contained in a child node are transferred to the parent node thereof, since a large number of keywords are assigned to one node, it becomes difficult for the user to select one from many alternatives. To solve such a problem, a parameter words_max is designated so that the number of keywords contained in one node is smaller than the parameter words_max.

FIG. 11C shows the result of the shrinking process for terminal nodes in the case that the parameter words_max=4 is designated to the keyword character string graph shown in FIG. 11A. In FIG. 11B, terminal nodes "あいぼう(aibou)" and "あ(aibori)" have one keyword each. The parent node "あいぼ(aibo)" of the terminal nodes "あいぼう(aibou)" and "あいぼり(aibori)" has two child nodes that do not have keywords. Thus, the sum of the number of keywords contained in the parent node "あ(aibo)" and the number of keywords contained in the child nodes "あいぼう (aibou)" and "あいぼり (aibori)" is smaller than words_max=4. Consequently, since the child nodes "あいぼう (aibou)" and "あいぼり(aibori)" can be shrunk, in FIG. 11C, the child nodes "あいぼう (aibou)" and "あいぼり (aibori)" are deleted. The keywords of the child nodes are transferred to the parent node "あいぼ (aibo)". Likewise, in the algorithm proc_shrunk_leaf( ) shown in FIG. 17, the following transfer functions and node keywords are used.

t {" "}=あ(a)+ t {"あ (a)"}=あいぼ(aibo)+あお(ao)

t {"あお(ao)"}=あおぞaozo)+ nk {"あいぼ(aibo)"}=相棒aibou: mate)+アイボリ(aiborī:ivory)+ nk {"あお(ao)"}=青ao: blue)+蒼(ao: dark blue)+ nk {"あおぞら(aozora)"}=青空(aozora: blue sky)+

Figure 18:
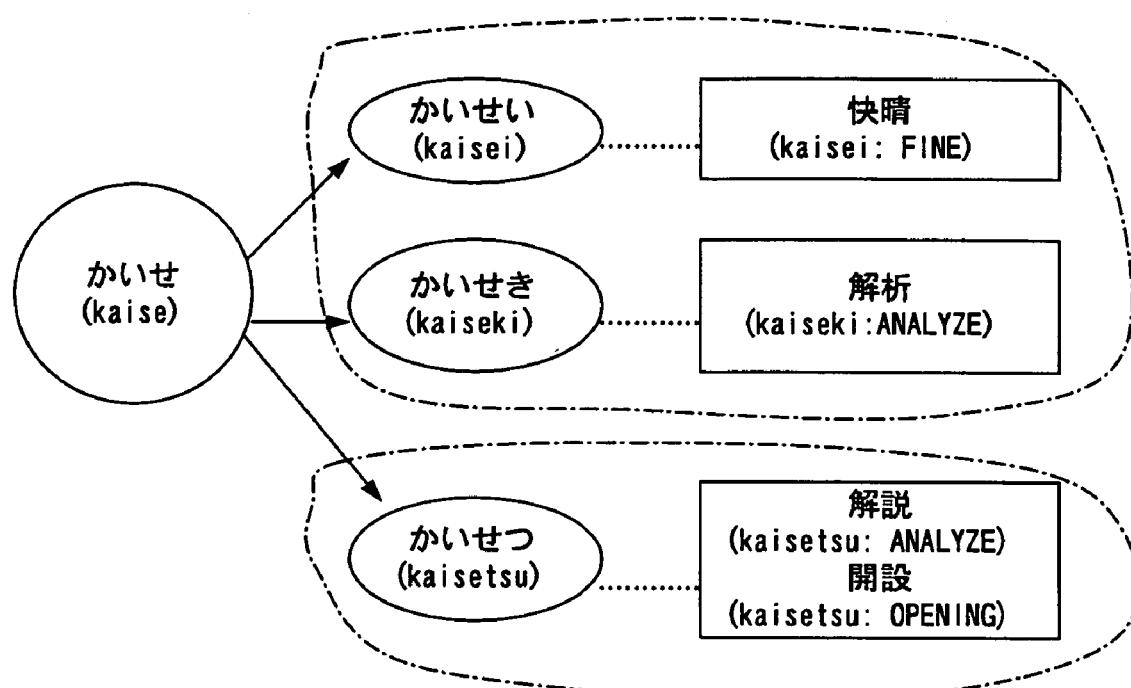
FIG. 18 is a schematic diagram showing an example of a keyword character string graph of which terminal nodes have been shrunk.

FIG. 18 shows an example of a keyword character string graph of which terminal nodes have been shrunk. In FIG. 18, a parent node "かいせ (kaise)" has three terminal nodes "かいせい kaisei)", "かいせき (kaiseki)", and "かいせつ(kaisetu)". Since keywords contained in the terminal nodes "かいせい(kaisei)" and "かいせき (kaiseki)" are "快晴(kaisei: fine)" and "解析 kaisetsu: analyze)", respectively, the terminal nodes can be shrunk. In addition, since keywords contained in the terminal node "かい (kaisetu)" are "解説 kaisetsu: explanation)" and "開設 (kaisetsu: opening)", the terminal node "かいせ (kaisetu)" can be shrunk. Thus, as shown in FIG. 18, there are two shrinking methods. However, the former case allows a smaller total number of nodes to be decreased that the latter case. According to the embodiment of the present invention, terminal nodes are sorted based on the number of keywords contained therein. Thus, as with the former case, terminal nodes can be effectively shrunk.

Figure 19:
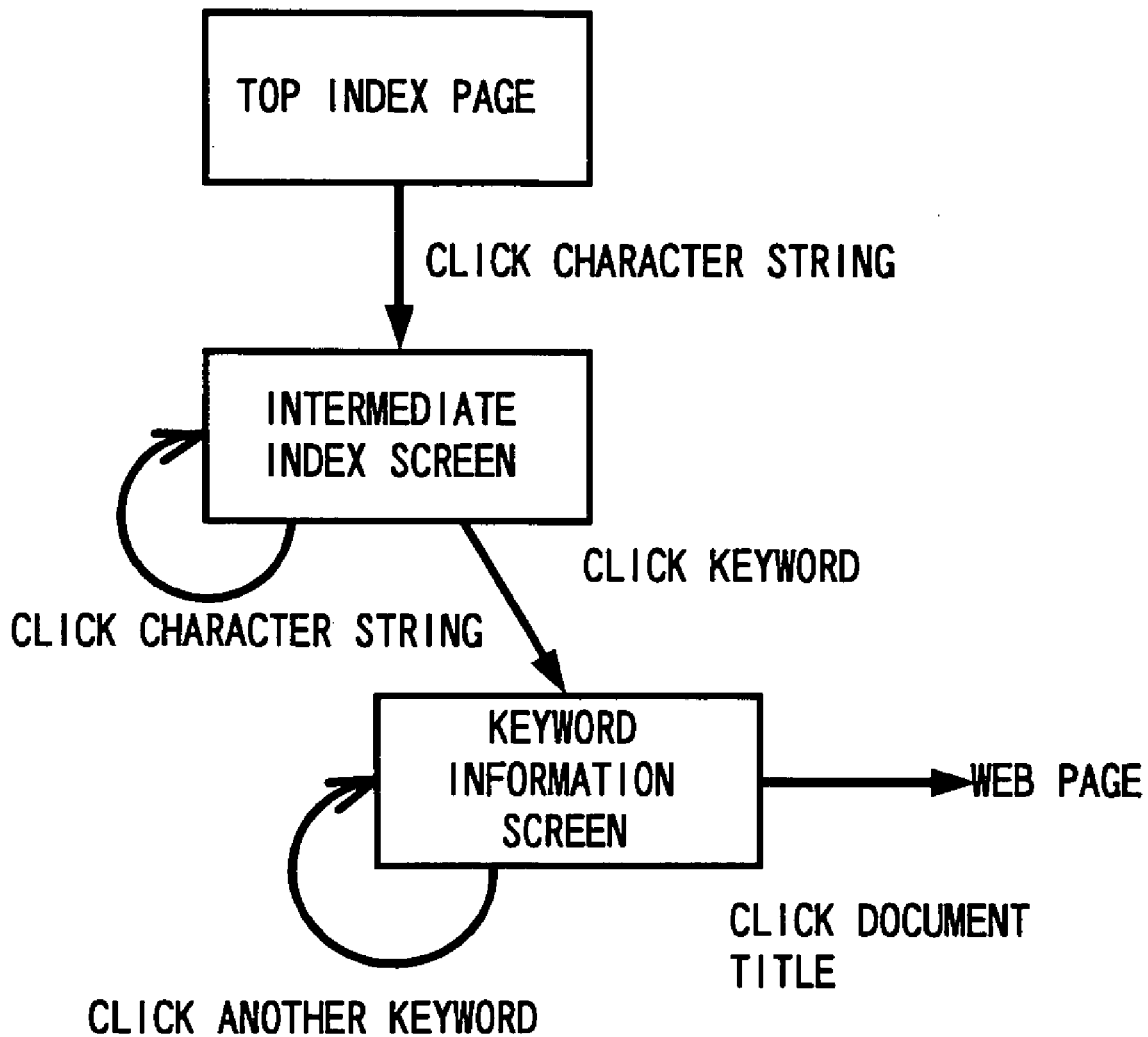
FIG. 19 is a schematic diagram showing transitions of an index screen.

Next, with reference to FIGS. 19 to 26, an example of an index created by the index creating device 24 will be described. FIG. 19 shows a transition from a top index screen to a document page through an intermediate index screen and a keyword information screen. Next, with reference to FIG. 19, the transition of a idex screen that appears on the displaying device will be described. As shown in FIG. 19, the top index screen is displayed first. When the user selects a first part of pronunciation characters (spelling) of a keyword on the top index screen, an intermediate index screen appears. When the user selects the next portion of the pronunciation characters (or spelling) of the keyword on the intermediate index screen, the next intermediate index screen appears. When the user repeats the selecting operation, the desired keyword appears. When the user selects the desired keyword, a keyword information screen appears.

When the user selects another keyword, a relevant keyword information screen appears. When the user selects the title of a page (document) that he or she wants to browse, the page appears through a relevant link. The user can perform the selecting operation using a mouse, a pen-type pointing device, or the like. Each screen may be generated as for example hypertext.

Figure 20:
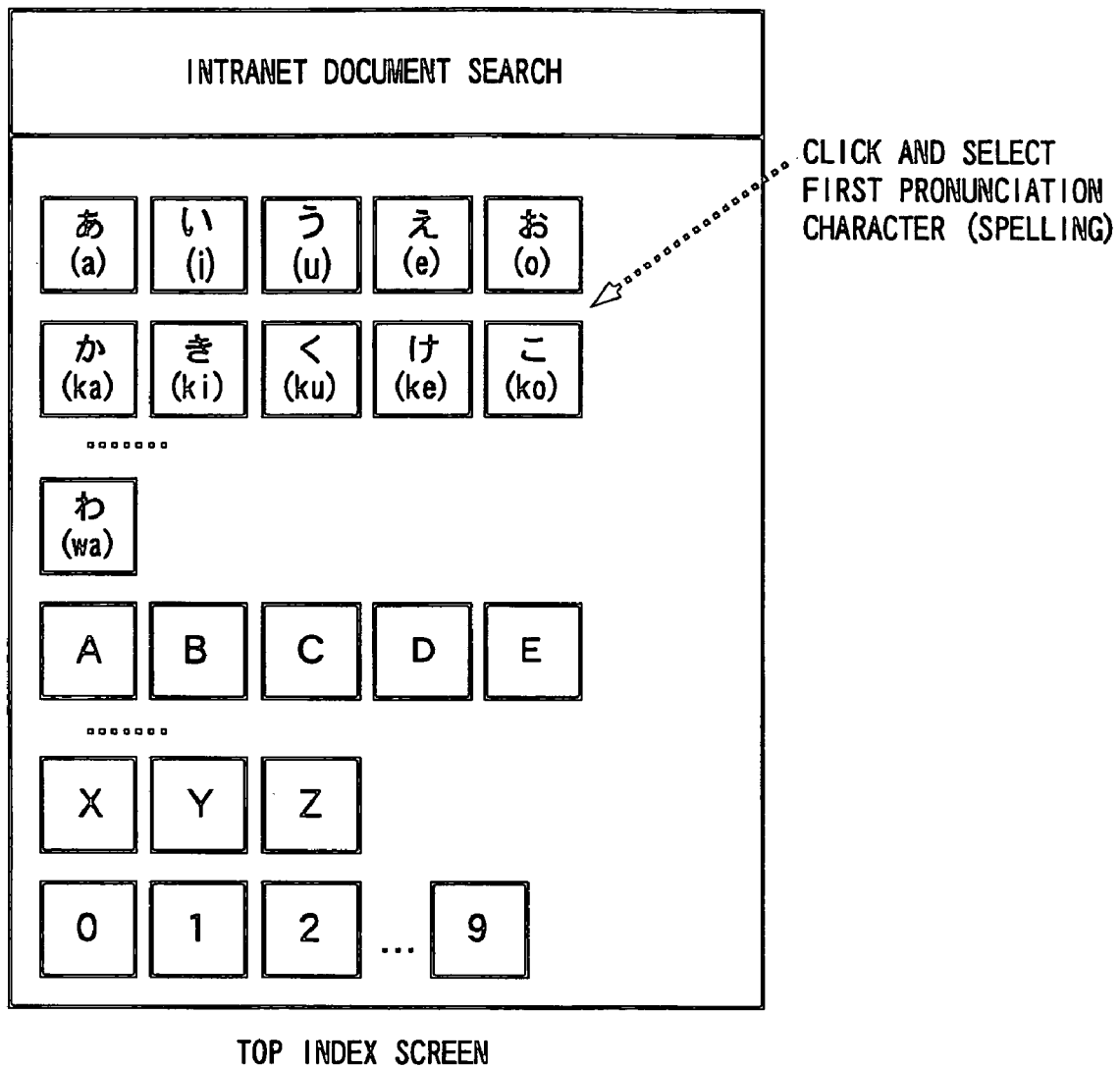
FIG. 20 is a schematic diagram showing an example of a top index screen.

FIG. 20 shows an example of the top index page. On the top index page, characters (or character strings) starting from "top" of the index information table 61 appear. In FIG. 20, 50-Kana characters and alphanumeric characters (including 0 to 9) appear. When the user clicks the first pronunciation character (spelling) of the desired keyword, the next screen appears.

FIG. 21 shows another example of the top index screen. In FIG. 21, since pronunciation characters of keywords have been standardized and/or nodes are shrunk, "ぢ (zi)" and "づ(zu)" of "だ(da) line" of 50-Kana characters have been deleted from the index. Likewise, alphabetic characters "Y" and "Z" have been deleted.

Figure 22:
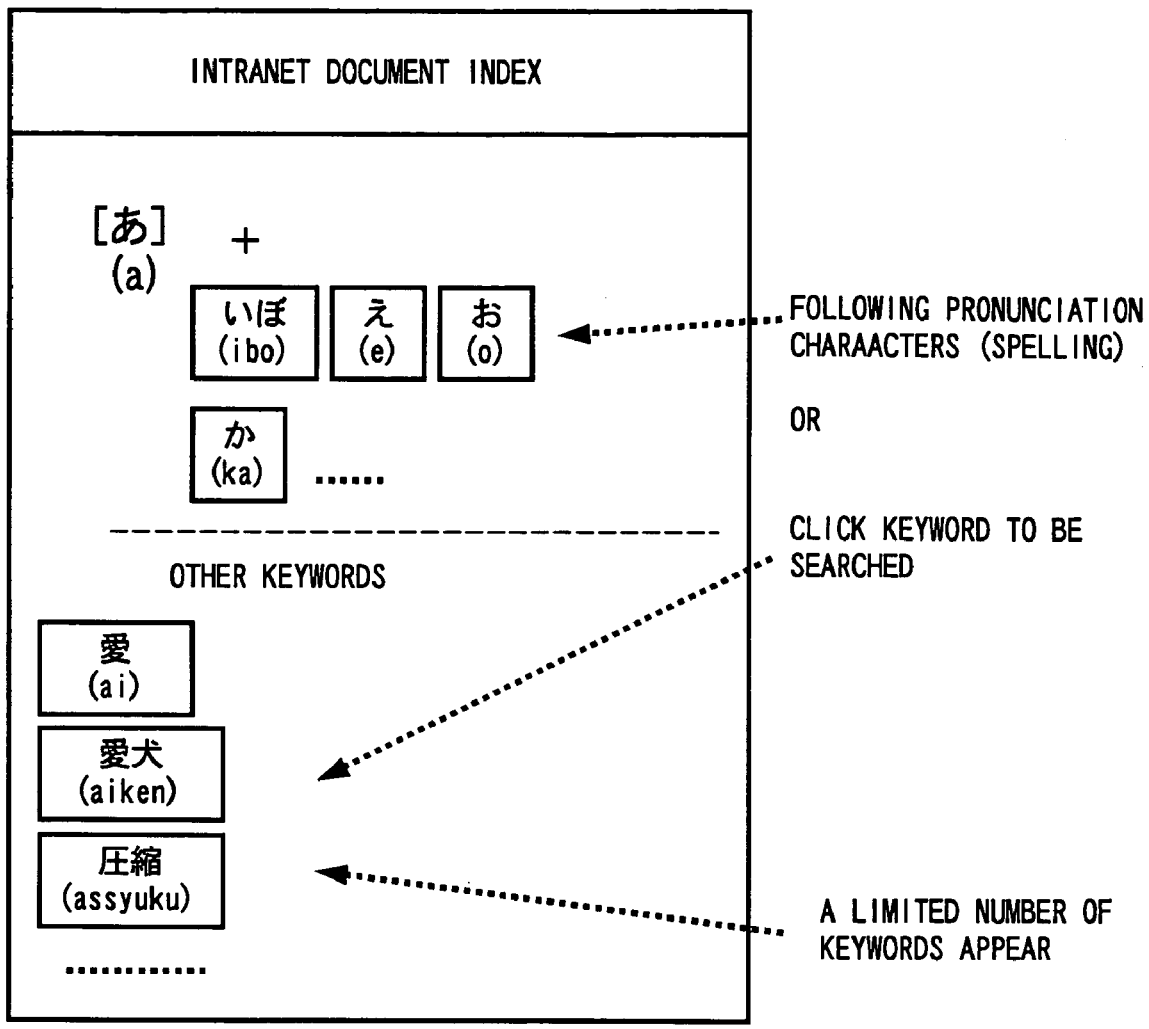
FIG. 22 is a schematic diagram showing a first example of an intermediate index screen.

FIG. 22 shows an example of the intermediate index screen. Referring to FIG. 22, "あ(a)" is selected on the top search page. On an upper area of the screen, character strings that follow "あ(a)"appear. On a lower area of the screen, other keywords appear. The intermediate search screen is created with the index information table 61 shown in FIG. 5 and the keyword table 51 shown in FIG. 4 (a keyword ID is obtained from a keyword).

In FIG. 22, the character "あ (a)" is followed by characters (character strings) "いぼ(ibo)", "え (e)", " (o)", and so forth. When the user selects a character string "いぼibo)", a character string "あいぼ (aibo)" appears. As other keywords, a predetermined number (for example, 20 or less) of keywords such as "愛(ai: love)" and "愛犬(aiken: pet dog)" appear in a lower area in the screen. All keywords of which there are no further pronunciation characters to be selected in the upper area of the screen appear in the area. Thus, the user can know that keywords whose pronunciation characters do not appear in the upper area and the lower area are not contained in the index.

FIG. 23 shows another example of the intermediate index screen. Referring to FIG. 23, the user has selected a character "い(i)" on the top index screen. On the upper screen area, character strings that follows the character "い(i)" appear. On the lower screen area, other keywords appear. In FIG. 23, the character "い (i)" is followed by character strings "い(i)", "える(ero)", and so forth. A predetermined number (for example, 20 keywords or less) of keywords such as "イオン(ion)", "イネーブル (ineburu)", and so forth appear.

FIG. 24 shows another example of the intermediate index screen. Referring to FIG. 24, the user has selected a character string "いべんと (ibento)". Since the node "イベント(ibento)" does not have child nodes, the character string "いべんと (ibento)" is not followed by other character strings. Instead, keywords appear. The user selects a desired keyword on the screen. The user can know that keywords that do not appear on the screen are not contained in the index.

According to the related art reference, since the user should select one pronunciation character at a time, he or she should repeat the same operation to input a long keyword. In contrast, according to the embodiment of the present invention, since nodes are shrunk, it is not necessary for the user to select one pronunciation character at a time for a long keyword. In other words, the user can select for example two pronunciation characters at a time (such as a character string "いぼ(ibo)" shown in FIG. 22 or a character string "えろ (ero)" shown in FIG. 23). Thus, the number of times of the input operation preformed by the user can be decreased.

In addition, all keywords that are not followed by other pronunciation characters appear on the screen. In contrast, if a keyword and its following pronunciation characters do not appear on the screen, it is clear that the keyword which the user wants to select is not contained in the index. Thus, the problem is solved in that the user input pronunciation characters of a keyword one by one and when the user inputs the last pronunciation character, the user knows the keyword is not contained in the index.

In addition, when terminal nodes are shrunk, since only a limited number of keywords designated by the parameter word_max appear, the user can relatively easily search the index for a desired keyword. Thus, it is convenient for the user to select a keyword on a limited space screen of a mobile terminal unit such as a cellular phone.

In addition, as a search interface, the user can input a particular keyword with a smaller number of times of the input operation. The embodiment of the present invention has these advantages against the Kana-Kanji converting technologies of the related art references.

No conversion key operation is required.

With minimum information to specify a keyword rather than all pronunciation characters for the desired keyword, the desired keyword can be input.

Thus, in the case that a keyword set contains only a character string "ナレッジマネージメント(narejji manējimennto: knowledge management)" as a word that starts with a character string "なれ (nare)", when the user inputs only characters "な (na)" and "れ (re)", the keyword "ナレッジマネージメント(narejji manējimento: knowledge management) appears.

Figure 25:
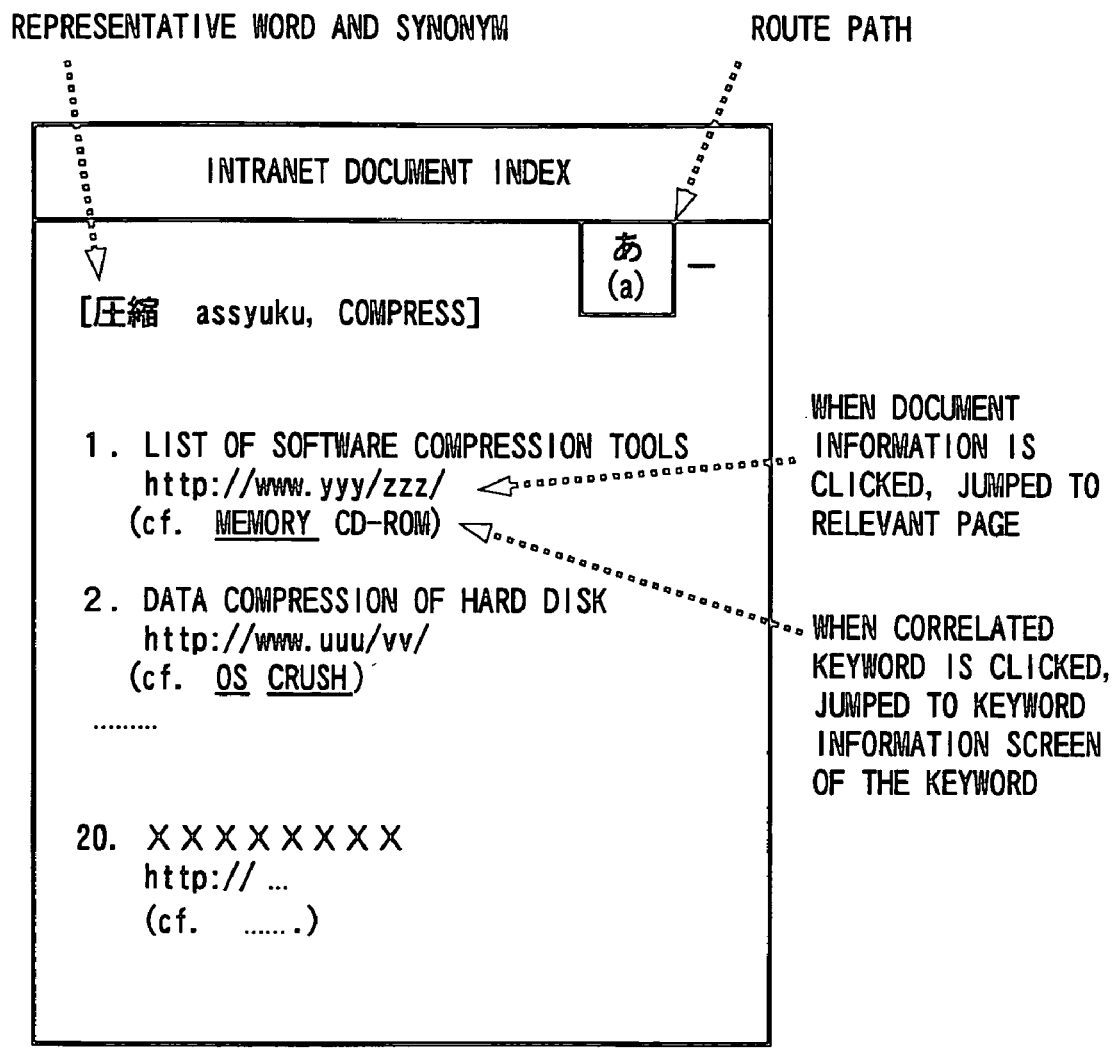
FIG. 25 is a schematic diagram showing an example of a keyword information screen.

FIG. 25 shows an example of the keyword information screen. Referring to FIG. 25, the user has clicked a keyword "圧縮(assyuku: compress)" on an intermediate screen. In FIG. 25, a representative word "圧縮 (assyuku)" and a synonym "compress" appear. Those words are obtained from the keyword table 51 and the keyword relation table 52 shown in FIG. 4. On an upper right area of the screen, a character "あ (a)" appears. The character represents the path from the preceding screen. Thus, the user can evoke the preceding screen and prevent himself or herself from getting lost in hypertext. On the screen, titles, link information, and other keywords of documents appear. Since a predetermined number (for example 20 or less) of documents appear in the order of priority, the user can easily select a desired one from them. A list of document IDs can be obtained from the correlated document table 62 shown in FIG. 5. Information of each document ID is contained in the document information table 41 shown in FIG. 3. Other keywords are obtained from the correlated keyword table 63 shown in FIG. 5. When the user selects desired document information that he or she wants to browse, the document linked from the keyword information screen appears.

FIG. 26 shows another example of the keyword information screen. Referring to FIG. 26, the user has clicked a keyword "イベントカレンダー(ivento karendā: event calendar)" on an intermediate screen. On an upper right area of the screen, character strings "トップ (toppu:top)"-い"- "イベント(ibento)" appear. Those character strings represent the route path of the current screen. When the user clicks a path, a screen corresponding to the clicked path appears.

FIG. 27 shows the structure of an intranet document searching apparatus according to a second embodiment of the present invention. Referring to FIG. 27, a collecting device 81 and a synonym dictionary 82 are additionally comprised in the structure of the first embodiment shown in FIG. 2. The collecting device 81 is for example a web robot that collects a large number of documents from the intranet (or the Internet). The synonym dictionary (synonym data) 82 contains part of information of an identical keyword relation table. An inputting device and an outputting device may be for example a web browser 83.

The collecting device 81 automatically collects documents from the network and gets their text parts. For example, banner icons, menulinks, common text strings such as copyright notices, etc. are deleted and only text parts are extracted. A keyword extracting device 22 extracts keywords from each collected page and totalizes keyword occurrence frequencies of keywords of the page. The keyword extracting device 22 automatically selects important documents based on the keyword occurrence frequencies using the synonym dictionary 82. Thus, the keyword extracting device 22 automatically selects a large number of documents of the intranet (or the Internet).

Figure 28:
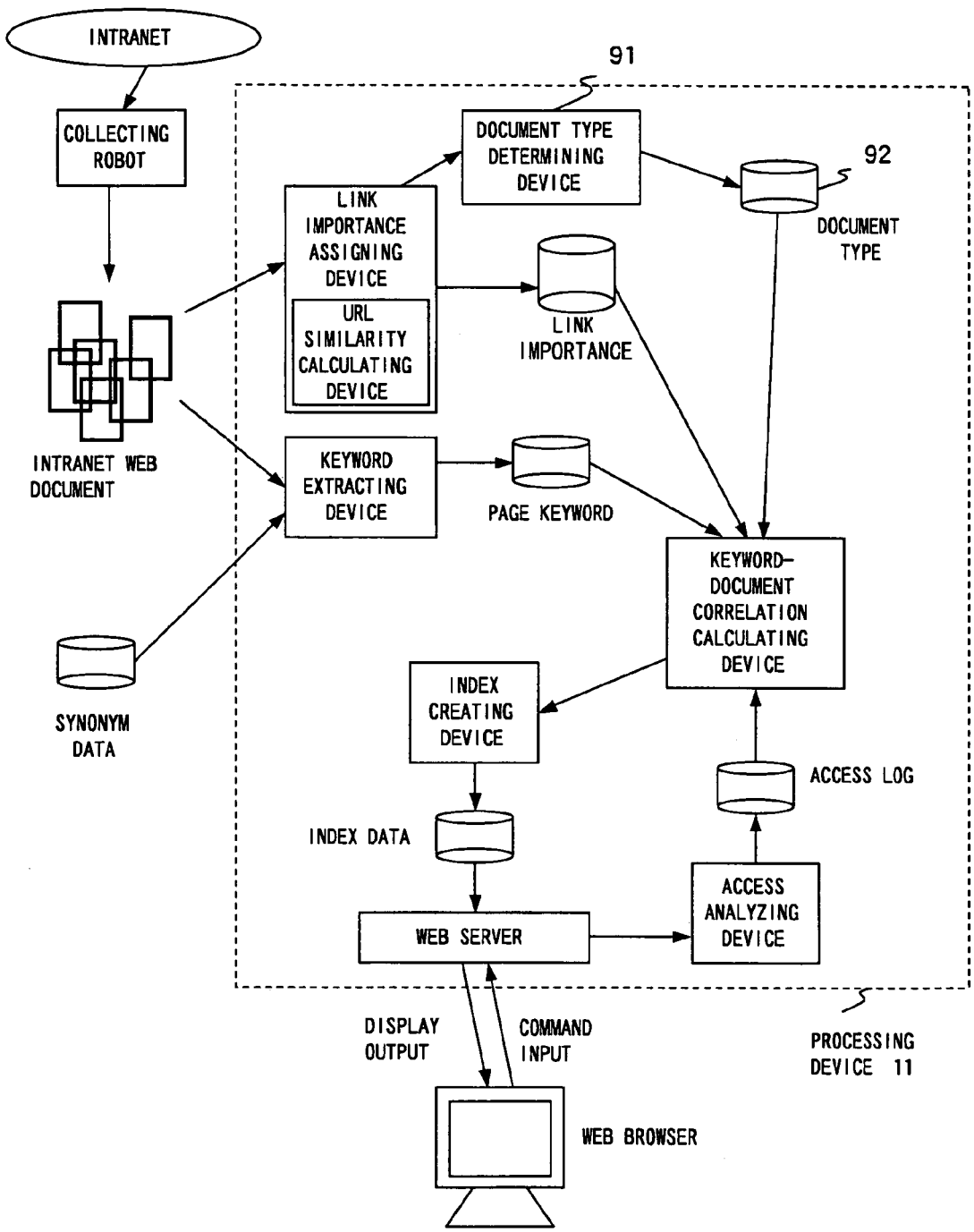
FIG. 28 is a block diagram showing the structure of a document searching apparatus according to a third embodiment of the present invention.

FIG. 28 shows the structure of an intranet document searching apparatus according to a third embodiment of the present invention. The intranet document searching apparatus according to the third embodiment searches documents of a particular type. Referring to FIG. 28, a document type determining device 91 is additionally comprised in the structure of the second embodiment shown in FIG. 27. The document type determining device 91 determines a document type of document collected from the intranet (or the Internet) based on a link relation and a URL thereof. Specifically, the document type determining device 91 determines the type of the content of the document based on the URL similarity calculated by a link importance assigning device 21 and the number of other documents linking to/linked from the document (the number of links point from/to the document) represented by the link relation extracted by the link importance assigning device 21 regardless of the content of the document. The document type determining device 91 determines the document type based on the following rules:

A document linking to more than a predetermined number of documents whose URL similarity is lower than a predetermined value is a link list.

A document linking to more than a predetermined number of documents whose URL similarity is higher than a predetermined value is a menu (entry) page.

A document linked from more than a predetermined number of documents whose URL similarity is lower than a predetermined value is a menu (entry) page.

A document that does not satisfies the above three conditions and that is linking to a plurality of documents that is less than a predetermined number and whose URL similarity is higher than a predetermined value is a contents page.

Thus, the document type determining device 91 can categorize document types (such as a menu page, a link list, a contents page, and so forth) of document (web pages) with sufficient probability.

The document type determining device 91 determines the document type of document and outputs a determined document type 92 to a keyword-document correlation calculating device 23. The keyword-document correlation calculating device 23 selects document of a particular type based on the determined document type 92 and calculates the document correlation based on the link importance, the page keywords, and the access log of the selected document. For example, the keyword-document correlation calculating device 23 may select document as contents pages and calculate the correlation for the contents pages.

Thus, the intranet (or Internet) document searching apparatus shown in FIG. 28 can adequately file documents as documents to be listed on an index by limitting document types based on the determination by the document type determining device 91.

FIG. 29 shows the structure of a link list creating system according to a fourth embodiment of the present invention. Referring to FIG. 29, the link list creating system comprises a collecting device 101, a processing device 102, and an inputting/outputting device 107. The collecting device 101 is, for example, a web robot that collects a large amount of document from the Internet (or/and the intranet). The processing device 102 comprises a link importance assigning device 21, a URL character string determining device 103, an index creating device 24, and a web server 106. The link importance assigning device 21 calculates the link importance of a document based on a URL similarity and a link relation and outputs a calculated link importance 31 to the index creating device 24.

The URL character string determining device 103 determines the contents of the collected document based on a characteristic of the character string of the URL (regardless of the contents). The URL character string determining device 103 determines the contents of the document based on, for example, the following rules:

When the character string of the URL of document contains "Y2K", "y2k", or "y2000", the document is a document correlated with the year 2000 problem.

When the character string of the URL of document contains "news", "release", or "press" followed by a numeric character string (sometimes representing information of date and time), the document is a document of a news (press) release.

When the character string of the URL of a document, contains "java" or "JAVA", the document is correlated with Java.

When the character string of the URL of a document contains "download", "dwnload", or "dwnld", the document is correlated with download.

When the character string of the URL of a document contains "LINUX", "linux", or "Linux", the document is correlated with Linux.

Thus, the URL character string determining device 103 determines a document with a particular URL and outputs the determined particular URL set 104 to the index creating device 24. The index creating device 24 arranges the document in the particular URL set 104 in descending order of the link importance based on the link importance 31, extracts a predetermined number of document which are ranked high, creates a link list thereof, and outputs the created link list as a link list 105 to the web server 106. When the number of URLs obtained by the URL character string determining device 103 is small, the URL character string determining device 103 may check the link relation and add other pages referenced (linked) to the URLs. That is because similar pages are often referenced by similar link lists. The web server 106 provides the link list to the user. The user sees the link list through the web browser 107 and input a command to the web server 106.

Thus, corresponding to character string of URLs, contents are determined regardless of the contents of document pages. Corresponding to the determined result, a link list is created. Consequently, a high quality link list corresponding to the contents can be easily created.

FIG. 30 shows the structure of a link list creating system according to a fifth embodiment of the present invention. Referring to FIG. 30, the link list creating system is accomplished by adding a document type determining device 111 to the link list creating system shown in FIG. 29. The function and the operation of the document type determining device 111 are the same as those of the document type determining device 91 of the document searching apparatus according to the third embodiment shown in FIG. 28.

The collecting device 101 collects a large amount of document from the Internet (or/and the intranet). A link importance assigning device 21 calculates the link importance of the document based on the URL similarity and link relation thereof and outputs a link importance 31 to an index creating device 24. A URL character string determining device 103 determines a particular URL based on a characteristic of the character string thereof and outputs a determined particular URL set 104 to the index creating device 24. A document type determining device 111 determines the document type of each document based on the URL similarity and the number of other documents linking to/linked from the document without analysis of the contents of the document and outputs the determined document type 112 to the index creating device 24.

The index creating device 24 selects document of a particular document type from the particular URL set 104 based on the document type 112. Thereafter, the index creating device 24 arranges selected document in descending order of the link importance based on the link importance 31 of the selected document, extracts a predetermined number of higher ordered documents, creates a link list with URLs of the extracted documents, and outputs the link list 105 to a web server 106. The web server 106 provides the link list 105 to the user. The user sees the link list 105 through the web browser 107 and inputs a command to the web server 106.

Thus, a high quality link list corresponding to the contents can be easily created.

The document searching apparatuses shown in FIGS. 2, 27, and 28 and the link list creating systems shown in FIGS. 29 and 30 can be accomplished by an information processing device (computer) as shown in FIG. 31. The information processing device shown in FIG. 31 comprises a CPU 121, a memory 122, an inputting device 123, an outputting device 124, an external storing device 125, a medium driving device 126, and a network connecting device 127. Those devices are mutually connected by a bus 128.

The memory 122 includes for example a ROM (Read Only Memory) and a RAM (Random Access Memory). The memory 122 stores programs and data that are used for individual processes. The CPU 121 executes programs using the memory 122 so as to perform predetermined processes.

Each device and each unit that compose the document searching apparatuses shown in FIGS. 2, 27, and 28 and the link list creating systems shown in FIGS. 29 and 30 are stored as programs to predetermined program code segments of the memory 122.

The inputting device 123 includes for example a keyboard, a pointing device, and a touch panel. The inputting device 123 is used to input user's commands and information. The outputting device 124 includes for example a display device and a printer. The outputting device 124 is used to prompt the user for data and output processed results.

The external storing device 125 is for example a magnetic disc device, an optical disc device, or a magneto-optical disc device. The external storing device 125 stores the above-described programs and data. When necessary, the programs and data are loaded from the external storing device 125 to the memory 122.

The medium driving device 126 drives a portable record medium 129 and accesses the content thereof. The portable record medium 129 includes for example a memory card, a floppy disk, a CD-ROM (Compact Disc Read Only Memory), an optical disc, and a magneto-optical disc that can be read by any computer. The above-described programs and data may be stored to the portable record medium 129. When necessary, the programs and data can be loaded from the portable record medium 129 to the memory 122.

The network connecting device 127 communicates with an external device through any network (line) such as LAN (Local Area Network) or WAN (Wide Area Network). When necessary, the above-described programs and data may be received from the external device and loaded to the memory 122.

FIG. 32 shows a computer readable record medium and a transfer signal that allow programs and data to be supplied to the information processing device shown in FIG. 31.

Functions equivalent to the above-described document searching apparatuses and link list creating systems according to the above-described embodiments can be accomplished by a general-purpose computer. To do that, programs that cause a computer to perform the same processes as the document searching apparatuses and the link list creating systems are pre-recorded to a computer readable record medium 129. As shown in FIG. 32, the programs are read from the portable record medium 129 to the computer and then temporarily stored to the memory 122 of the computer or the external storing device 125. The CPU 121 reads and executes the programs.

In addition, when programs are downloaded from a database 130 to a computer, a transfer signal that is transferred through a line (transmission medium) may cause a general-purpose computer to perform the functions equivalent to the document searching apparatuses and the link list creating systems.

According to the present invention, when the importance of a document is calculated, since the URL similarity is considered along with the link relation, the importance of a particular site and a mirror site thereof can be prevented from being excessively evaluated. Thus, important documents can be more accurately selected than the related art references.

In addition, the importance calculated according to the present invention can be prevented from being intentionally controlled by a malicious person.

In addition, according to the present invention, by successively clicking a portion of pronunciation characters (or spelling) which is equal to or more than one character of a keyword, the keyword or document that contains the keywords can be effectively accessed.

A predetermined number of keywords or documents can be listed on a keyword index screen. Thus, the user can easily select a desired keyword or document from the index.

In addition, the keyword index can be effectively used for a medium that has a limited space screen such as a portable terminal unit.

In addition, according to the present invention, the document correlation is calculated based on the occurrence frequencies of keywords in documents and the above-mentioned importance of each document, and a link list to access documents is arranged in the order of the correlation with the keywords. Thus, a link list that allows the user to quickly access adequate documents corresponding to a particular keyword can be created.

According to the present invention, based on the URL similarity and the number of other documents linking to/linked from the document, the document types of each document (such as a menu, a link list, and contents) can be determined. Moreover, based on the calculated result of the link importance for documents selected based on the determined result of the document type and/or in combination of the link importance and the occurrence frequencies of the keywords, a link list that allows the user to access more adequate documents can be created.

In addition, according to the present invention, since particular URLs are determined, document of a particular field can be automatically and accurately selected. In addition, based on the link importance and the determined particular URLs, a link list that allows the user to access document of a particular field can be accurately and easily created.

In addition, based on document types determined in the above-described manner, document of a particular document type can be selected from document having particular URLs. A link list containing selected document is created based on the above-mentioned link importance. Thus, a link list that allows the user to access adequate document of a particular field can be created.

While the invention has been described with reference to the preferred embodiments thereof, various modifications and changes may be made to those skilled in the art without departing from the true spirit and scope of the invention as defined by the claims thereof.

What is claimed is:

1. A document searching apparatus for searching a document group having a link relation for a document, comprising:

a link importance assigning unit weighting the link relation and assigning link importance which indicates importance of the document based on the weighted link relation to the document; and an accessing unit accessing the document based on the link importance, wherein said link importance assigning unit includes:

a URL similarity calculating unit calculating a URL similarity that is a text similarity of character strings of URLs that represent the location of the documents and that is an appearance of written characters of URLs, wherein said link importance assigning unit calculates the link importance based on an inverse URL similarity and the link relation of the document, so that a link weight increases as URL similarity decreases.

2. The document searching apparatus as set forth in claim 1, further comprising:

a keyword extracting unit extracting text parts from the documents and extracting a keyword from the document contents.

3. The document searching apparatus as set forth in claim 2,
wherein said keyword extracting unit calculates an occurrence frequency of the keyword in the document, and
wherein said keyword extracting unit further comprises:
a keyword-document correlation calculating unit calculating the correlation of the keyword and the document based on the link importance and the occurrence frequency of the keyword.

4. The document searching apparatus as set forth in claim 3, further comprising:
a monitoring unit monitoring accesses from a user and generating an access log, and
wherein said keyword-document correlation calculating unit calculates the correlation based on the keyword occurrence frequency, the link importance, and the access log.

5. The document searching apparatus as set forth in claim 3, further comprising:
a document type determining unit determining a document type of the document based on the URL similarity, the number of links from the document, and the number of links to the document,
wherein said keyword-document correlation calculating unit selects the document based on the document type and calculates the correlation for the selected document.

6. The document searching apparatus as set forth in claim 3, further comprising:
an index creating unit creating an index for accessing the document corresponding to pronunciation characters or spelling of the extracted keyword.

7. The document searching apparatus as set forth in claim 6, further comprising:
a selecting unit allowing the user to select a portion of the pronunciation characters or spelling of the keyword,
wherein said index creating unit places less than a predetermined number of documents highly correlated with the keyword in the index based on the correlation calculated by said keyword-document correlation calculating unit, and
wherein said accessing unit accesses the document based on the selected keyword.

8. The document searching apparatus as set forth in claim 1, further comprising:
a collecting unit collecting the document from a network.

9. The document searching apparatus as set forth in claim 1,
wherein said link importance assigning unit causes the weight of the link relation between the documents with a high URL similarity to be decreased.

10. The document searching apparatus as set forth in claim 1,
wherein said link importance assigning unit causes the document that is linked from an important document and whose URL similarity is low to be important.

11. The document searching apparatus as set forth in claim 1,
wherein said link importance assigning unit causes the importance of a document linked from many documents whose URL similarity are high to be decreased.

12. A document searching apparatus for searching a document group having a link relation for a document, comprising:
a link importance assigning unit weighting the link relation and assigning link importance which indicates importance of the document based on the weighted link relation to the document; and
an accessing unit accessing the document based on the link importance, and
wherein said link importance assigning unit includes:
a URL similarity calculating unit calculating a URL similarity that is a similarity of character strings of URLs that represent the location of the documents and that is an appearance of written characters of URLs,
wherein said link importance assigning unit calculates the link importance based on the URL similarity and the link relation of the document,
wherein the link importance of each document is defined as a solution of the following simultaneous linear equation (1), assuming that $C_q$ is constant (the lower limit of the importance that depends on each page) for each p∈DOC and that when a page p is linked to a page q, the link weight lw(p, q) is defined by the formula (2):

$$Wq = Cq + \sum_{p \in Refed(q)} Wp * lw(p, q) \quad (1)$$

$$lw(p, q) = diff(p, q) \Big/ \sum_{i \in Ref(p)} diff(p, i) = \frac{1}{sim(p, q) \sum_{i \in Ref(p)} \frac{1}{sim(p, i)}} \quad (2)$$

where DOC={p1, p2, ... , pN} is a set of documents calculated for the link importance; Wp is the link importance of the page p; Ref(p) is a set of pages linked from the page p; Refed(p) is a set of pages linking to the page p; sim(p, q) is the URL similarity of the pages p and q; diff(p, q)=1/sim(p, q) is the difference.

13. The document searching apparatus as set forth in claim 1,
wherein the URL similarity is determined based on characters of a URL containing a server address.

14. A document index creating apparatus for creating an index of a document group having a link relation, comprising:
a link importance assigning unit assigning a link importance to the document based on the link relation;
a keyword extracting unit extracting a keyword from the document;
an index creating unit creating an index for accessing the keyword based on pronunciation characters or spelling of the extracted keyword; and
an accessing unit accessing document assigned the link importance corresponding to the keyword when the pronunciation characters or spelling of the keyword are selected from the index,
wherein said link importance assigning unit includes:
a URL similarity calculating unit calculating a URL similarity that is a text similarity of character strings of URLs that represent the location of the documents and that is an appearance of written characters of URLs,
wherein said link importance assigning unit calculates the link importance based on an inverse URL similarity and the link relation of the document, so that a link weight increases as URL similarity decreases.

15. A document index creating apparatus for creating an index of a document group having a link relation, comprising:

a link importance assigning unit assigning a link importance to the document depending on whether or not URLs of the documents are similar;

a keyword extracting unit extracting a keyword from the document; and an index creating unit creating an index for accessing the document corresponding to pronunciation characters or spelling of the extracted keyword based link importance, wherein said link importance assigning unit includes:
a URL similarity calculating unit calculating a URL similarity that is a text similarity of character strings of URLs that represent the location of the documents and that is an appearance of written characters of URLs, wherein said link importance assigning unit calculates the link importance based on an inverse URL similarity and the link relation of the document, so that a link weight increases as URL similarity decreases.

16. A link list creating system for creating a link list for a document group having a link relation, comprising:

a collecting unit collecting the documents from a network;

a link importance assigning unit assigning a link importance of the document as an importance calculated based on the link relation to the document;

a URL charcter string determining unit determining a URL having a particular charcterisitic of a charcter string from the documents;

an index creating unit creating a link list for listing less than a predetermined number of links to the documents based on the link importance and the particular charcterisitic of the character string of the URL; and a document type determining unit determining a document type based on a URL similarity represnting a text similarity between character strings of URLs of the documents and being an appearance of written characters of URLs, the number of links to the document, and the number of links from the documents, wherein said index creating unit selects the document based on the document type and creates a link list of the selected document, and wherein said link importance assigning unit calculates the link importance based on an inverse URL similarity and the link relation of the document, so that a link wieght increase as URL similarity decreases.

17. A document searching method for searching a document group having a link relation for a document, comprising:

assigning a link importance as an importance of the document calculated with weighting the link relation to the document, comprising:
calculating a URL similarity that is a text similarity of character strings of URLs that represent the location of the documents and that is an appearance of written characters of URLs;
calculating the link importance based on the URL similarity and the link relation of the document with said link importance being based on an inverse URL similarity and the link relation of the document, so that a link weight increases as URL similarity decreases; and
accessing the document based on the link importance.

18. The document searching method as set forth in claim 17, further comprising:
extracting a keyword from the document.

19. The document searching method as set forth in claim 17, further comprising:
calculating an occurrence frequency of the keyword in the document, and
calculating the correlation of the keyword and the document based on the link importance and the occurrence frequency of the keyword.

20. The document searching method as set forth in claim 19, further comprising:
monitoring accesses from a user and generating an access log; and
calculating the correlation based on the keyword occurrence frequency, the link importance, and the access log.

21. The document searching method as set forth in claim 19, further comprising:
determining a document type of the document based on the URL similarity, the number of links to the document, and the number of links from the document; and
selecting the document based on the document type and calculating the correlation of the selected document.

22. The document searching method as set forth in claim 18, further comprising:
creating an index for accessing the document corresponding to pronunciation characters or spelling of the extracted keyword.

23. The document searching method as set forth in claim 17, further comprising:
placing less than a predetermined number of documents which are correlated with the keyword in the index;
selecting a portion of the pronunciation characters or spelling of the keyword; and
accessing the document corresponding to the selected portion of the pronunciation characters or spelling of the selected keyword.

24. The document searching method as set forth in claim 17, further comprising:
collecting the document from a network.

25. A link list creating method for creating a link list for a document group having a link relation, comprising:
collecting the document from a network;
assigning a link importance which indicates importance of the document to the document based on the link relation;
determining a URL having a particular characteristic of a character string from the URLs of each document;
creating a link list for listing less than a predetermined number of links to the document based on the link importance and the particular characteristic of the character string of the URL
determining a document type based on a URL similarity that is a text similarity between character strings of URLs (Uniform Resource Locators) of the documents and that is an appearance of written characters of URLs, the number of links to the document, and the number of links from the document, and
selecting the document based on the document type, and
wherein the creating creates the link list for the selected document based on the link importance and the particular characteristic of the character string of the URL, and
wherein said link importance being based on an inverse URL similarity and the link relation of the document, so that a link weight increases as URL similarity decreases.

26. A computer readable record medium for recording a program that causes a computer to execute a process for creating a link list for a document group having a link relation, the program comprising:
  collecting documents from a network;
  assigning a link importance which indicates importance of the document to each document based on the link relation, including:
    calculating a URL similarity that is a text similarity of character strings of URLs that represent the location of the documents and that is an appearance of written characters of URLs,
    calculating the link importance based on the URL similarity and the link relation of the document with said link importance being based on an inverse URL similarity and the link relation of the document, so that a link weight increases as URL similarity decreases;
  determining a URL having a particular characteristic of a character string from the URLs of documents; and
  creating a link list for listing less than a predetermined number of links to the documents based on the link importance and the particular characteristic of the character string of the URL.

27. A document searching apparatus for searching a document group having a link relation for a document, comprising:
  a link importance assigning unit weighting the link relation and assigning link importance which indicates importance of the document based on the weighted link relation to the document, said link importance assigning unit comprising a similarity calculating unit calculating a URL similarity that is a similarity URLs that represent the location of the documents and that is an appearance of written characters of URLs and said link importance assigning unit calculates the link importance based on an inverse URL similarity and the link relation of the document, so that a link weight increases as URL similarity decreases; and
  an accessing unit accessing the document based on the link importance.

28. A document searching method for searching a document group having a link relation for a document, comprising:
  assigning a link importance as an importance of the document calculated with weighting the link relation to the document, comprising:
    calculating a similarity that is a similarity of URLs that represent the location of the documents;
    calculating the link importance based on an inverse URL similarity and the link relation of the document, so that a link weight increases as URL similarity decreases; and
  accessing the document based on the link importance.

* * * * *

UNITED STATES PATENT AND TRADEMARK OFFICE
CERTIFICATE OF CORRECTION

PATENT NO.         : 7,225,181 B2                                           Page 1 of 1
APPLICATION NO. : 09/768062
DATED              : May 29, 2007
INVENTOR(S)        : Hiroshi Tsuda It is certified that error appears in the above-identified patent and that said Letters Patent is hereby corrected as shown below:

First Page, Column 2 (Other Publications), Line 2, change "computional" to --computational--.

Column 31, Line 8, after "based" insert --on the--.

Column 31, Line 26, change "charcter" to --character--.

Column 31, Line 27, change "charcterisitic" to --characteristic--

Column 31, Line 27, change "charcter" to --character--.

Column 31, Line 31-32, change "characterisitic" to --characteristic--.

Column 31, Line 34, change "represnting" to --representing--.

Column 31, Line 38, change "documents," to --document,--.

Column 31, Line 44-45, change "wieght increase" to --weight increases--.

Column 32, Line 27-28, Claim 23, change "claim 17" to --claim 22--.

Column 32, Line 53, after "URLs" delete "(Uniform Resource Locators)".

Column 32, Line 57, after "type," delete "and".

Signed and Sealed this

Twenty-ninth Day of April, 2008

JON W. DUDAS
*Director of the United States Patent and Trademark Office*